(12) United States Patent
Dash et al.

(10) Patent No.: US 9,559,862 B1
(45) Date of Patent: Jan. 31, 2017

(54) DETERMINING CONNECTIVITY OF VARIOUS ELEMENTS OF DISTRIBUTED STORAGE SYSTEMS

(75) Inventors: Prasanta R. Dash, San Jose, CA (US); Chaitanya Yalamanchili, Sunnyvale, CA (US)

(73) Assignee: Veritas Technologies LLC, Mountain View, CA (US)

(*) Notice: Subject to any disclaimer, the term of this patent is extended or adjusted under 35 U.S.C. 154(b) by 993 days.

(21) Appl. No.: 13/606,752

(22) Filed: Sep. 7, 2012

(51) Int. Cl.
*H04L 12/28* (2006.01)
*H04L 12/40* (2006.01)
*G06F 3/06* (2006.01)
*H04L 12/46* (2006.01)
*H04L 12/54* (2013.01)

(52) U.S. Cl.
CPC ............... *H04L 12/40* (2013.01); *G06F 3/06* (2013.01); *H04L 12/46* (2013.01); *H04L 12/54* (2013.01)

(58) Field of Classification Search
None
See application file for complete search history.

(56) References Cited

U.S. PATENT DOCUMENTS

| | | | | |
|---|---|---|---|---|
| 6,754,718 B1 * | 6/2004 | Dobberpuhl | ............ | H04L 41/12 707/999.2 |
| 7,383,381 B1 * | 6/2008 | Faulkner | ............... | G06F 3/0607 711/114 |
| 7,430,568 B1 * | 9/2008 | DeKoning | .......... | G06F 11/0727 |
| 7,533,169 B1 * | 5/2009 | Gold | .................. | G06F 11/0751 709/223 |
| 7,636,801 B1 * | 12/2009 | Kekre | ................ | H04L 67/1097 709/218 |
| 7,774,444 B1 * | 8/2010 | George | ................. | H04L 41/145 709/217 |
| 7,860,015 B1 * | 12/2010 | Panelli | ...................... | G06F 3/06 370/241 |
| 7,886,182 B1 * | 2/2011 | Coatney et al. | ................... | 714/3 |
| 8,131,784 B1 * | 3/2012 | Zhuge et al. | ................. | 707/823 |
| 8,275,886 B1 * | 9/2012 | Galan | ................. | H04L 41/0886 709/220 |
| 8,620,921 B1 * | 12/2013 | Susarla et al. | ................ | 707/738 |
| 8,631,114 B1 * | 1/2014 | Bauer et al. | .................. | 709/224 |
| 9,075,755 B1 * | 7/2015 | Haase | ................. | G06F 11/1456 |
| 2003/0188218 A1 * | 10/2003 | Lubbers et al. | .................. | 714/5 |

(Continued)

*Primary Examiner* — Bob Phunkulh
(74) *Attorney, Agent, or Firm* — Campbell Stephenson LLP

(57) ABSTRACT

Various systems and methods for determining connectivity of various elements of distributed storage systems. For example, one method involves generating first connectivity information for a node, where the node can to access data that is organized using logical objects. The logical objects include first logical objects and second logical objects. Each of the second logical objects includes one or more of the first logical objects. The first connectivity information for the node indicates accessibility of the node to the first logical objects. The method also includes generating second node connectivity information for the node, where the second connectivity information for the node indicates accessibility of the node to the second logical objects. The generating the second node connectivity information is based on the first connectivity information.

23 Claims, 16 Drawing Sheets

(56) References Cited

U.S. PATENT DOCUMENTS

| | | | |
|---|---|---|---|
| 2004/0122917 A1* | 6/2004 | Menon | G06F 17/30194 709/219 |
| 2005/0114477 A1* | 5/2005 | Willging et al. | 709/220 |
| 2005/0138174 A1* | 6/2005 | Groves | G06F 3/0605 709/226 |
| 2005/0138316 A1* | 6/2005 | Groves | G06F 3/0607 711/170 |
| 2005/0240727 A1* | 10/2005 | Shah | G06F 3/0605 711/114 |
| 2006/0004918 A1* | 1/2006 | Lubeck et al. | 709/223 |
| 2006/0015529 A1* | 1/2006 | Yagawa | 707/104.1 |
| 2007/0050587 A1* | 3/2007 | Palapudi et al. | 711/164 |
| 2007/0079097 A1* | 4/2007 | Karnowski et al. | 711/170 |
| 2008/0208917 A1* | 8/2008 | Smoot | G06F 17/30067 |
| 2009/0249016 A1* | 10/2009 | Acedo | G06F 3/0605 711/170 |
| 2010/0064168 A1* | 3/2010 | Smoot | G06F 11/2069 714/6.12 |
| 2012/0278382 A1* | 11/2012 | Faith et al. | 709/203 |
| 2012/0278553 A1* | 11/2012 | Mudhiganti et al. | 711/114 |
| 2012/0330903 A1* | 12/2012 | Periyagaram et al. | 707/692 |

* cited by examiner

DETERMINING CONNECTIVITY OF VARIOUS ELEMENTS OF DISTRIBUTED STORAGE SYSTEMS

BACKGROUND OF THE INVENTION

Field of the Invention

This application related to distributed storage systems. Particularly, this application relates to determining connectivity and/or faults related to various elements objects stored by such distributed storage systems.

Description of the Related Art

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. Storage area networks (SANs) including hundreds of storage devices can be used to provide storage for hosts.

SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices.

BRIEF DESCRIPTION OF THE DRAWINGS

The embodiments of the present application may be better understood, and its numerous objects, features, and advantages made apparent to those skilled in the art by referencing the accompanying drawings.

Figure 1:
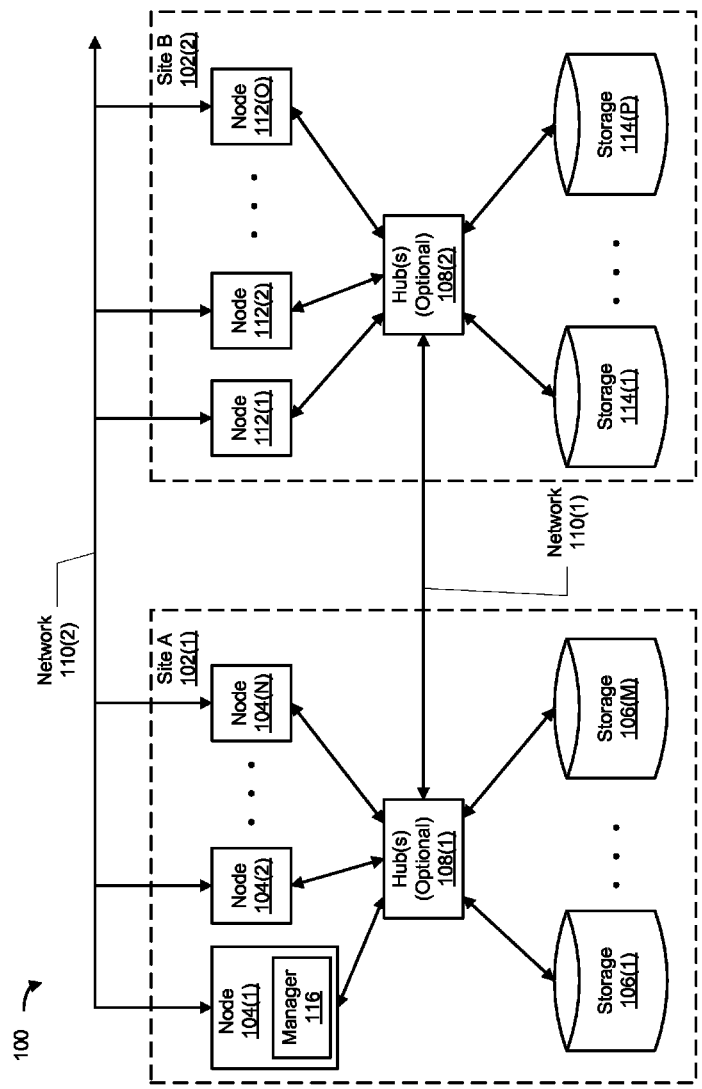
FIG. 1 is a block diagram illustrating a distributed storage system that includes multiple sites, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to generating and using connectivity information for logical objects, nodes, and/or devices of a distributed storage system. An example of such a distributed storage system is shown in FIG. 1. The distributed storage system can include multiple sites, and it can implement any one (or more) of a variety of storage access, backup, archiving, and/or redundancy operations, such as implemented using RAID 0-RAID 6, among others. The multiple sites can be connected together, such as using a network. Each site can include one or more nodes. Each such node can implement manager software that can manage these data storage operations. The manager software can generate and/or store keep connectivity information for various logical objects that are used to store data, as well as various nodes for each of the sites. The manager software can, upon detecting an access error to storage maintained by one of the sites, determine the logical objects affected by this storage error. The manager software can make this determination using the connectivity information.

FIG. 1 is a block diagram illustrating a distributed storage system 100 that includes a collection of nodes and storage. System 100 includes two sites, site A 102(1) and site B 102(2), although distributed storage system 100 can be easily expanded to have more, or less, sites, as desired. Site A 102(1) includes nodes 104(1)-104(N), and site B 102(2) includes nodes 112(1)-112(N). Each of nodes 104(1)-104(N) and/or 112(1)-112(N) can be accessed by clients (not shown), such as over a network 110(1) and/or 110(2).

Nodes 104(1)-104(N) can access storage devices 106(1)-106(M), such as either directly or by using one or more hub(s) 108(1). Nodes 104(1)-104(N) can access storage devices 106(1)-106(M) to perform various data operations, such as to read, write, backup, and/or archive data, among others. Similarly, nodes 112(1)-112(O) can access storage devices 114(1)-114(P), such as either directly or by using one or more hub(s) 108(2). Nodes 112(1)-112(O) can access storage devices 114(1)-114(P) to perform various data operations, such as to read, write, backup, and/or archive data, among others.

Manager software 116 can coordinate and/or manage the accessing of data among client(s), node(s), and/or storage device(s). Manager software 116 can also manage any number of backup, archiving, and/or redundancy operations, such as implemented using RAID 0 through RAID 6, collectively referred to herein as "storage operations." For example, manager software 116 can perform a mirroring storage operation that saves the data stored using site A 102(1) (e.g., using storage devices 106(1)-106(M)) in one or more secondary sites, sites as using site B 102(2) (e.g., using storage devices 114(1)-114(P)). In another example, manager software 116 can perform striping operations using the storage devices of site B 102(2).

In one embodiment, manager software 116 generates connectivity information for the logical objects and/or nodes of each site. For example, manager software 116 can generate connectivity information (such as map(s)) for nodes of each site, such as nodes 104(1)-104(N) and/or nodes 112(1)-112(O). Node connectivity information can indicate, for example, whether node 104(1) can communicate with various logical objects stored by storage devices (and other physical devices) in each of the sites of the distributed storage system. Manager software 116 can generate node connectivity information using storage connectivity information, where storage connectivity information can indicate connectivity of a node to devices such as disks and LUNs.

In one embodiment, manager software 116 can also/instead generate connectivity information for logical objects of each site. For example, manager software 116 can generate connectivity information (such as map(s)) for the logical objects that are stored by site 102(1) and/or 102(2). Object connectivity information can indicate, for example, whether subdisks of each plex (i.e., hierarchical logical objects used by nodes of a given site) can process I/O accesses from a given node. In one implementation, once the subdisk connectivity information is generated, object connectivity information of a hierarchical logical object that includes these subdisks can be generated as well.

Manager software 116 can also monitor if any of node(s) 104(1)-104(N), and/or nodes 112(1)-112(O) encounter any access errors. These access errors can include input/output (I/O) errors encounter during access of data stored by any of storage devices 106(1)-106(M) and 114(1)-114(P). Storage devices 106(1)-106(M) and 114(1)-114(P) can store data using logical abstractions. Use of such logical abstractions can make accessing storage devices easier to use and configure. Logical abstractions, also referred to herein as logical objects, can enable a user to view storage in terms of logical objects, such as logical storage devices, rather than in terms of the physical devices themselves. For example, physical devices providing similar functionality can be grouped into a single logical storage device that provides the capacity of the combined physical storage devices. One example of a logical storage device is a volume, as disk volumes typically provide the underlying physical storage. The use of such (logical) volumes, and other logical objects, can enable easier way to perform access and backup functionality. One implementation of logical objects is described below with reference to FIG. 2.

Manager software 116 can determine that an I/O error occurred during accessing of some logical object by node 112(1). This logical object can be a sub-object (e.g., a subdisk) of a volume that is stored by one or more of storage devices 106(1)-106(M) of site A 102(1). Node 112(1) can be performing a data write when encountering this I/O error. Node 112(1) can perform this data write as a part of a mirroring storage operation, such as to mirror data stored at site B 102(2) to site A 102(1). However, the I/O error when writing the data to site A's 102(1) subdisk does not necessarily indicate the logical objects that may also be affected by this I/O error. As described with reference to FIG. 2, the logical objects can be arranged hierarchically, for example, a plex logical object can include multiple subdisk logical objects.

In some embodiments, manager software 116 can use connectivity information to determine the scope of a logical fault as a result of this I/O error, the logical fault scope being the various logical objects that are affected by this I/O error. For example, manager software 116 can determine that multiple other subdisks are affected by this I/O error, and/or that a hierarchically higher logical object (e.g., a plex) and all the logical objects that it includes, are affected by this I/O error. In another example, manager software 116 can determine that only one subdisk is affected by this I/O error, and therefore that the logical object that is hierarchically higher (e.g., a plex) is only partially affected by this I/O error. In this example, the subdisk may have no connectivity, and this plex's other subdisks have full connectivity. As a result, this plex has partial connectivity. Determination of the logical fault, and thus faults of logical objects, can be used to isolate and/or correct the problem. Depending on implementation, such as on policy of the distributed storage system, manager software 116 can disconnect or suspend use of the faulty logical objects. Depending on the policy, manager software 116 can use other logical objects instead of the failed logical objects, i.e., to provide uninterrupted operation to any clients and/or perform the storage operations.

In some embodiments, manager software 116 can also determine the physical device(s) that are affected by and/or are causing this I/O error. For example, manager software 116 can determine that a combination of failed subdisks indicates that storage device 106(1) has failed. In another example, manager software 116 can determine that a combination of failed subdisks indicates that a portion of hub device 108(1) has failed. Such determination of a failed hardware device determination can be communicated to a system administrator. The system administrator can then take corrective steps to correct the failed physical device(s). In one embodiment, such determination of a failed hardware device determination can be used to automatically switch to another hardware device. For example, if it is determined that a port on hub 108(1) has failed, it may be possible to use another port 108(1).

Each node 104(1)-104(N) and/or 112(1)-112(O) can implement one or more virtual machines (not shown). Nodes 104(1)-104(N) and/or 112(1)-112(O) can implement virtual machine(s) using various virtualization technologies, including hypervisor technology, among others. Nodes 104(1)-104(N) and/or 112(1)-112(O) can communicate with each other via network 110(1)-110(2).

Storage devices 106 and/or storage devices 114 may be a shared storage device, such as a cluster shared volume. For example, storage devices 106(1)-106(M) can be implemented as a collection of hard disk drives aggregated to form at least one volume accessible for read and write operations by nodes 104(1)-104(N) and 112(1)-112(O). According to some embodiments, storage devices 106 and/or storage devices 114 can be formatted using a virtual machine file system (VMFS), or a similar file system that can be used by multiple virtual machines. Virtual machines can perform I/O reads and writes to storage devices 106 and/or storage devices 114, such as to read and write data.

Nodes of site B 102(2) can be used for providing data protection and/or back-up for virtual machines of site A 102(1) using any one of various data protection/back-up techniques. Typically, each node 104(1)-104(N) and/or 112(1)-112(O) can be implemented using a server, including one or more processors, memory, bus, etc. One example implementation of such a server is described below with reference to FIG. 10A. Network 110(1)-110(2) can be implemented as any one or more wired and/or wireless networks, including any combination of a local area network (LAN), and/or a storage area network (SAN), etc.

Figure 2:
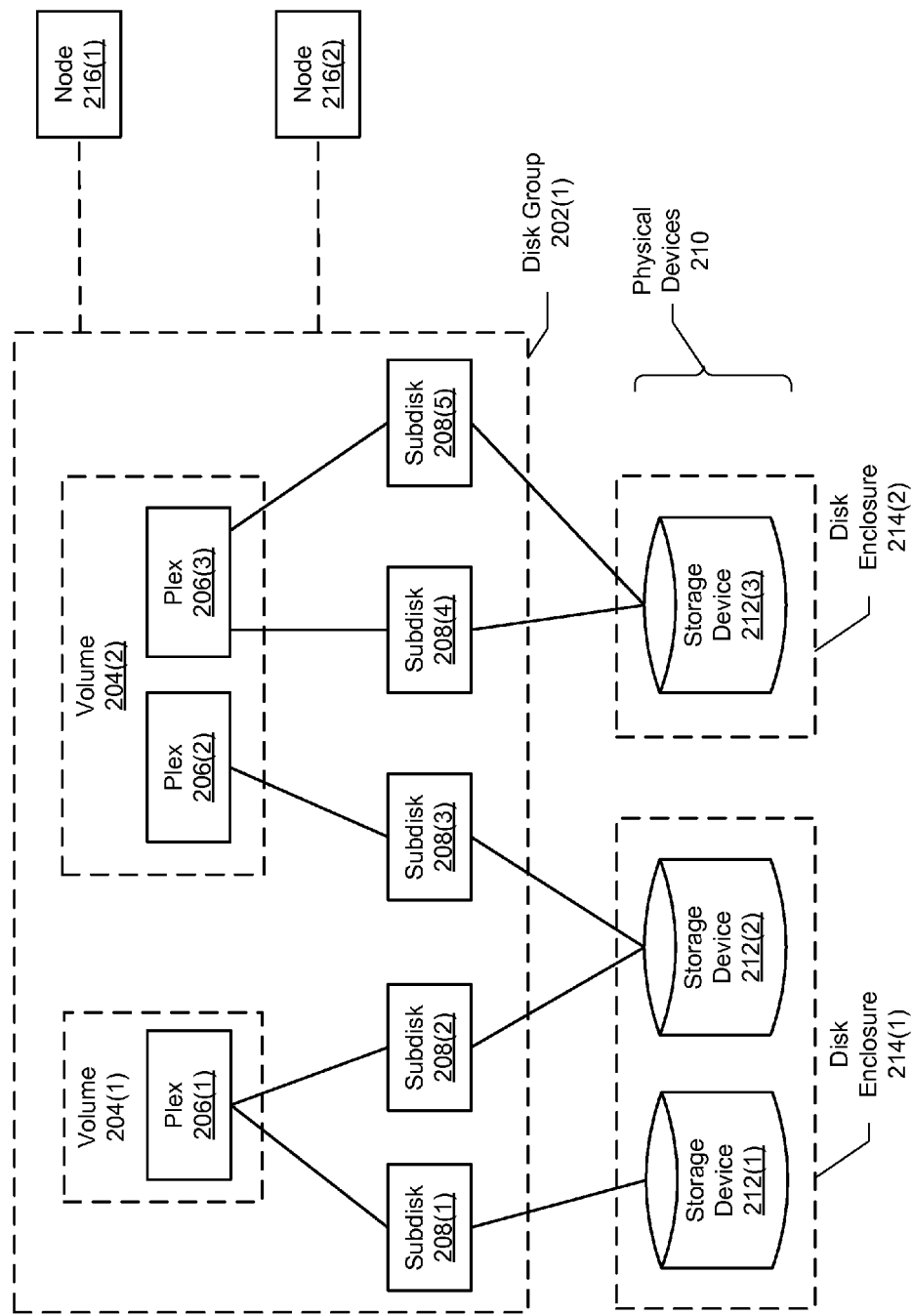
FIG. 2 is a block diagram illustrating relationship(s) between logical objects and physical elements of a distributed storage system, according to some embodiments.

FIG. 2 is a block diagram illustrating relationship(s) between logical objects and physical disks, according to some embodiments. Logical objects (that are stored using storage devices) are arranged hierarchically, e.g., in different hierarchical levels. In one embodiment, the logical objects can be arranged using objects such as disk groups, volumes, plexes, and subdisks, among others. However, the actual implementation and/or naming of logical objects may vary. Logical objects may be used to store application data as well as metadata, such as change logs, indices, and/or cache or staging area(s). Terminology and semantics of such logical objects may differ between implementations. As discussed above with reference to FIG. 1, the logical objects are accessible by one or more nodes. In some embodiments, the nodes access the data using logical object designation(s).

The logical objects can be arranged using hierarchical levels. These levels include a disk group 202(1), volumes 204(1) and 204(2), plexes 206(1)-206(3), and subdisks 208(1)-208(5). Other logical objects, such as subcache and subvolume, among others, can be used in addition to, or instead of, the ones described herein. Logical objects can implement various layouts of the distributed storage system such as implemented using RAID 0-RAID 6. Furthermore, logical objects can also implement various logs, such as change logs, and other elements used by backup, archiving, and/or redundancy operations, among others.

In some embodiments, the logical objects can also be grouped using different logical objects. For example, a set of volumes may form a volume set (such as used by a single file system), an application might use a set of volumes that are a part of a replication group. A log volume (that has its own plex and subdisk logical objects) may be associated with another volume. Furthermore, various such grouping might overlap. Even though a data volume and associated log volume can reside in same level, a write to a data volume can include a write to log volume. As a result, connectivity of the log volume may be implicitly factored into connectivity of the data volume. These various relationships are used by the software manager when generating connectivity information and/or calculating scope of logical faults.

In some embodiments, data can be stored using subdisks 208(1)-208(5), such as by using files. Subdisks 208(1)-208(5) can be included by various plexes 206(1)-206(3). For example, plex 206(1) includes subdisks 208(1) and 208(2), plex 206(2) includes subdisk 208(3), and plex 206(3) includes subdisks 208(4) and 208(5). Volume 204(1) includes plex 206(1), whereas volume 204(2) includes plexes 206(2) and 206(3). Volumes 204(1) and 204(2) can be included by disk group 202(1). The logical objects of disk group 202(1) can be accessed by nodes 216(1) and 216(2) (which can implement nodes 104(1)-104(N) and/or nodes 112(1)-112(O) of FIG. 1).

The logical objects, such as of disk group 202(1), are stored using physical devices 210. Physical devices 210 can include multiple storage devices 212(1)-212(3), such as storage devices 114(1)-114(P) of FIG. 1. Storage devices 212(1)-212(3) can be included by disk enclosures 214(1)-214(2). For example, disk enclosure 214(1) can be implemented by a first site (such as site A 102(1)) and disk enclosure 214(2) can be implemented by a second site (such as site B 102(2)). With reference to FIG. 1, manager software 116 can generate connectivity information that indicates accessibility of nodes (e.g., node(s) 216(1)-216(2)) to the logical objects (such as logical objects of disk group 202(1)). Manager software 116 can also generate connectivity information that indicates accessibility of logical objects of subdisk 202(1) to node(s) 216(1)-216(2). Manager software 116 can also generate connectivity information that indicates accessibility of storage devices, such as disk enclosures 214(1)-214(2), to node(s) 216(1)-216(2).

In some embodiments, node connectivity information indicates accessibility of nodes to the logical objects and/or devices. The node connectivity information can be generated using various techniques. In one implementation, each node can send one or more queries to various administrative modules, including manager software 116. Each node can thus query the administrative modules for information on various logical objects and/or devices that the node(s) can communicate with. In some embodiments, node connectivity information can be generated based on connectivity information of storage devices (e.g., disks, such as disks 212(1)-212(3)), and also on various relationships between the logical objects, nodes, and/or storage devices. Such relationships between connectivity information are shown with reference to FIG. 3.

Figure 3:
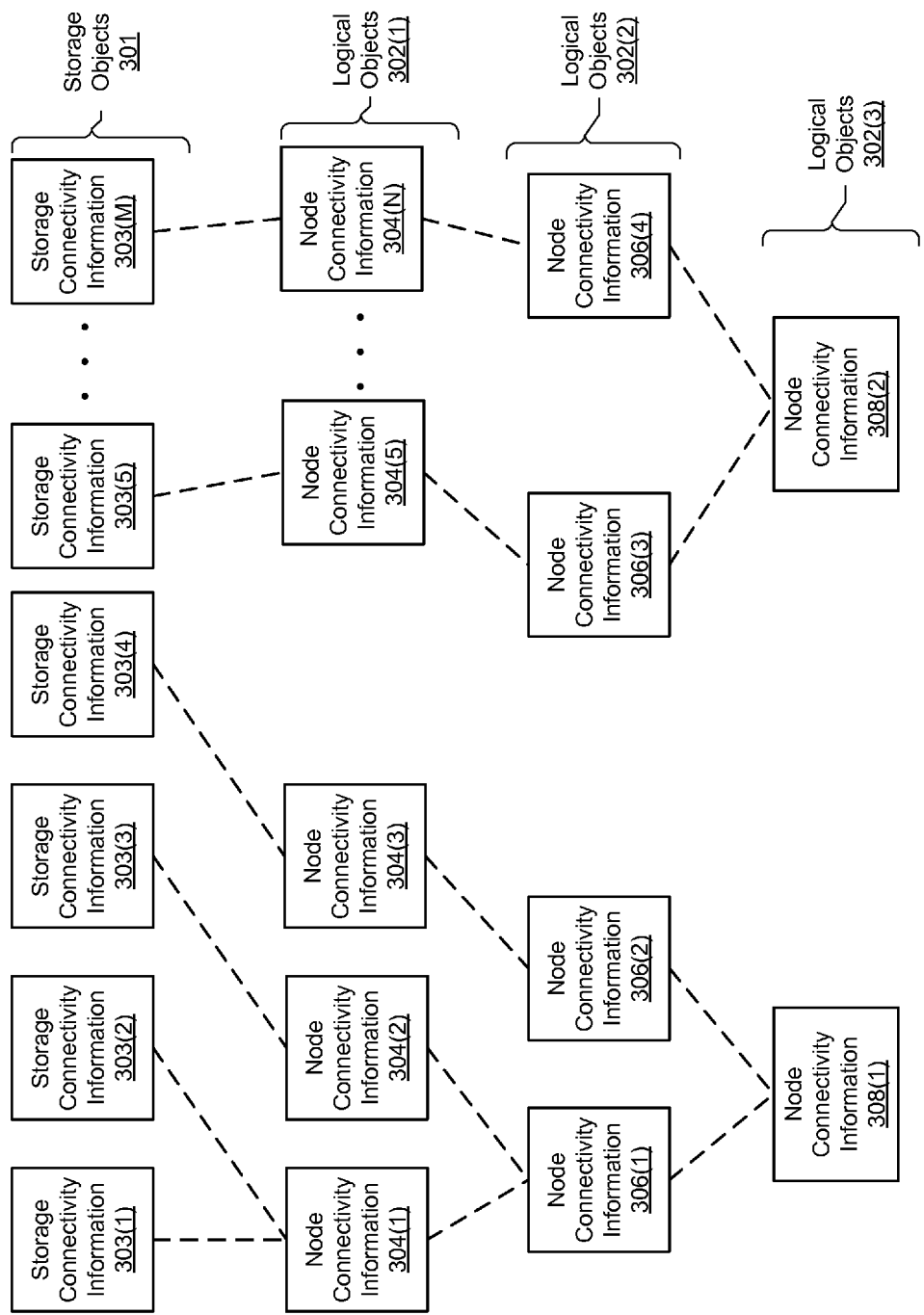
FIG. 3 is a block diagram illustrating relationship(s) between various connectivity information elements, according to some embodiments.

FIG. 3 is a block diagram 300 illustrating relationship(s) between various connectivity information elements, according to some embodiments. FIG. 3 illustrates storage connectivity information 301 as well as (node) connectivity information for multiple types of logical objects 302(1)-302(3) for one node, such as for node 216(1). In one embodiment, each node can include a set of storage connectivity information 301 and node connectivity information for multiple types of logical objects 302(1)-302(3), as calculated by that node, for multiple nodes of the distributed storage system. In one embodiment, each of the nodes generates and/or stores its own node connectivity information. In one embodiment, each of the nodes can also generate and/or store node connectivity for the other nodes. For example, node 216(1) can generate and store a set of connectivity information for node 216(1) and for node 216(2). Similarly, node 216(2) can generate and store a set of connectivity information for node 216(1) and for node 216(2). Differences in calculated connectivity information as calculated by each node, can be used to determine scope of error, as described below.

Storage objects 301 can indicate connectivity of each disk (or another low-level storage element), such as disk 212(1)-212(3) to each node. For example, storage connectivity information 303(1) can indicate accessibility of node 216(1) to disk 212(1). Similarly, storage connectivity information 303(2) can indicate accessibility of node 216(1) to another disk. It is noted that each such disk can be a physical disk, or a Logical Unit Drive (LUN). For example, storage connectivity information 303(1) and 303(2) can be associated with two separate LUNs of storage device 202(1). Storage objects 301 (including storage connectivity information 303(1)-303(M)) can be provided by manager software 116, disks themselves, and/or be generated by manager software 116 based on responses of various data accesses. Storage connectivity information 301 can be used to generate node connectivity information, such as for logical objects at a low level of the logical object hierarchy. It is noted that in some embodiments, each disks can correspond to multiple subdisks.

Logical objects 302(1) can indicate connectivity information for subdisks. In this example, logical objects 302(1) include node connectivity information 304(1)-304(N). Each of node connectivity information 304(1)-304(N) can indicate accessibility of a node (such as of node 216(1)) to each of subdisks 208(1)-208(5). Node connectivity information 304(1)-304(N) can be generated using storage connectivity information 303(1)-303(M). For example, node connectivity information 304(1) indicates accessibility of node 216(1) to subdisk 208(1), and can be generated using storage connectivity information 303(1) and 303(2), e.g., that are associated with two separate LUNs of storage device 202(1). In this example, subdisk 208(1) can include the two separate LUNs of storage device 202(1). Similarly, connectivity information 304(2) can indicate accessibility of node 216(1) to subdisk 208(2).

In one embodiment, the node connectivity information can include connectivity maps, which can represent a given node's connection to the logical objects. For example, a connectivity map can be implemented using binary code that includes a value of 0 for no or partial connectivity, and a value of 1 for full connectivity. However, connection maps that use additional connectivity levels are contemplated, such that can include a different value for each of the connectivity type. For example, node connectivity information 302(1) can indicate that node 216(1) has full accessibility to subdisks 208(1)-208(3), partial connectivity to subdisk 208(4), and no connectivity to subdisk 208(5). Each of node communication information can indicate different accessibility, i.e., indicating that each node has different accessibility to the subdisks. In one embodiment, node connectivity information can indicate connectivity to different levels of logical elements.

In one embodiment, node connectivity information 306(1)-306(4) (corresponding to logical objects 302(2)) can be generated based on node connectivity information 304(1)-304(N) (corresponding to logical objects 302(1)). Thus, node connectivity 306(1)-306(4) indicates accessibility of node 206(1) to plexes. For example, node connectivity 306(1) indicates accessibility of node 206(1) to plex 206(1). Node connectivity 306(1)-306(4) can be generated based on node connectivity information 304(1)-304(N). Thus, node connectivity information 306(1) for logical object of type 302(2) can be generated using node connectivity information 304(1) and 304(2) of type 302(1). Using the connectivity map example, node connectivity information for plexes (i.e., 306(1)-306(4)) can be generated by performing a logical AND (or an equivalent operation) using the subdisks that are included by each respective plex. For example, node connectivity information map 306(1) can be generated by performing a logical AND of node connectivity maps 304(1) and 304(2). Partial connectivity may be determined by performing logical OR operation on connectivity information of associated objects.

Similarly, node connectivity information 308(1)-308(2) (corresponding to logical objects 302(3)) can be generated based on node connectivity information 306(1)-306(4) (corresponding to logical objects 302(2)). Using the connectivity map example, node connectivity information for volumes (i.e., 308(1)-308(4)) can be generated by performing a logical AND (or an equivalent operation) using the plexes that are included by each respective volume. For example, node connectivity information map 308(1) can be generated by performing a logical AND of node connectivity maps 306(1) and 306(2). Depending upon semantics of the logical object and operation being performed (e.g., read or write), connectivity may be computed using logical operations, such as logical operations AND, OR, NOT (or other similar primitives such as XOR, NOR). If type of operation is not known and/or is not specified, information suitable for either/both may be returned.

In one embodiment, object connectivity information can also be generated based on node connectivity information. Although object connectivity information can be generated for any of the logical objects used by the distributed storage system. The object connectivity information is generated based on the node connectivity information associated with that logical object level (i.e., 302(2)) that is filtered for that given logical object. For example, object connectivity information can be generated for one of objects of level 302(2), such as for plex 206(1), based on node connectivity information 306(1)-306(4) for each of the nodes, and then filtered for plex 206(1). This generated object connectivity information would indicate accessibility of plex 206(1) to nodes 216(1) and 216(2). Similarly, object connectivity information can be generated for each of the logical objects shown in FIG. 2. In one embodiment, for some or all logical objects, object connectivity may be directly generated, i.e., instead of filtering node connectivity to generate object connectivity. Direct generation of object connectivity information can include manager software 116.

For example, with reference to FIG. 2, the manager software can generate (or update) node connectivity of logical objects, e.g., subdisks 208(2) and 208(3), using storage connectivity for disk 212(2). The manager software can make this determination either initially, or upon an error that associated with device 212(2). The software manager can generate node connectivity information for the plex and volume logical objects associated with subdisk 208(2). The software manager can also generate object connectivity for each of the logical objects. The software manager can also generate device connectivity information, e.g., for enclosure 214(1).

Figure 4:
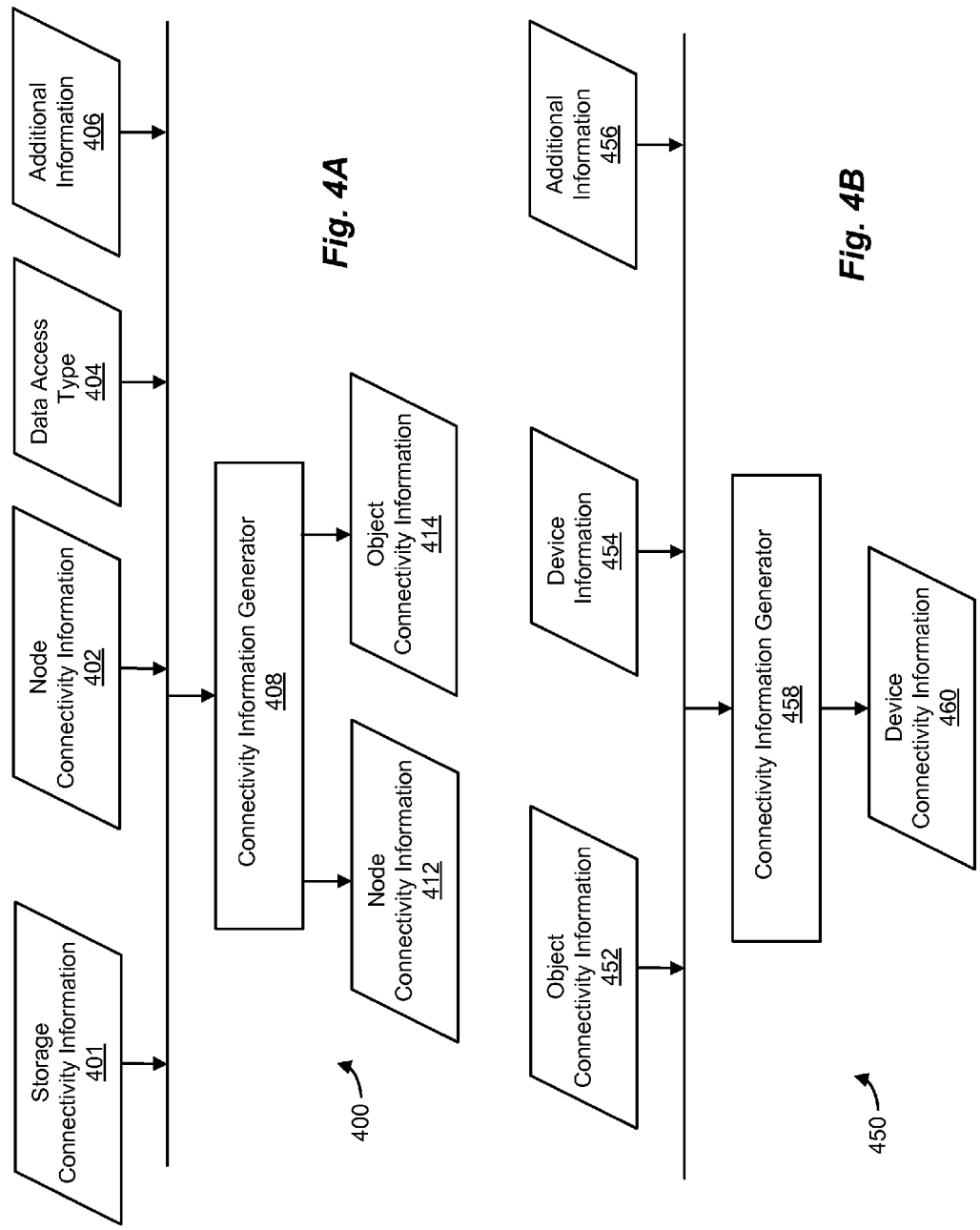
FIGS. 4A-4B are block diagrams illustrating generation of various connectivity information, according to some embodiments.

FIGS. 4A and 4B are block diagrams 400 and 450 illustrating generation of connectivity information, according to some embodiments. FIG. 4A illustrates a connectivity information generator 408 that receives one or more of storage connectivity information 401, node connectivity information 402, data access type 404, and additional information 406. Connectivity information generator 408 generates node connectivity information 412 and object connectivity information 414, as described with reference to FIG. 3. Furthermore, connectivity information generator 408 can generate read connectivity information and/or write connectivity information for the nodes and/or objects, such as based on data access type 404.

For data access type 404 of a read, connectivity information generator 408 can generate read node connectivity information that indicates whether a given node can read data from various logical objects. In one implementation, read node connectivity information indicates can be generated also based on additional information that can indicate a topology and/or backup technique implemented by the distributed storage system. For example, in case where a second plex is a mirror of a first plex, then read node connectivity information for the plex logical object level would indicate full or partial accessibility when only the first plex was fully accessible but the second plex was only partially or not accessible at all. This determination can be based on a policy where a read typically uses one accessible copy of data. In one embodiment, connectivity information may indicate that an object is degraded. Furthermore, connectivity computation can be constrained by various criteria, such as a site, a set of nodes, an enclosure, a given set of objects, and/or logical address space (e.g., offset or length) of an object.

For data access type 404 of a write, connectivity information generator 408 can generate write node connectivity information that indicates whether a given node can write data to various logical objects. For the above example where the second plex is a mirror of the first plex, then write node connectivity information for the plex logical object level would indicate no accessibility when the first plex was fully accessible but the second plex was only partially or not accessible at all. This determination would be thus indicate that a write typically needs both the copies of data to be fully accessible. In case of partial failure, connectivity information generator 408 can make a precise determination, such as if information such as offset and length of the device access and inaccessible regions of the plex are available. Connectivity information for other backup techniques and data access types can thus be calculated. In one embodiment, connectivity information generator 408 can compute connectivity by taking into account state of the logical objects. For example, when computing connectivity of the volume, plexes that are disconnected/or not active are not used in this computation.

FIG. 4B illustrates a connectivity information generator 458 that receives one or more of node connectivity information 452, data access type 454, and additional information 456. Connectivity information generator 458 generates device connectivity information 460 based on object connectivity information 452, device information 454, and additional information 456, such as described below with reference to FIG. 6C. In some embodiments, device connectivity information 460 indicates each device's accessibility to nodes and/or to objects. For example, device connectivity information 460 for storage device 212(1) can indicate connectivity of various logical objects, which are stored by storage device 212(1), to nodes 216(1) and 216(2). The device information and/or additional information can be used to determine which logical objects are stored by each of the devices.

Figure 5:
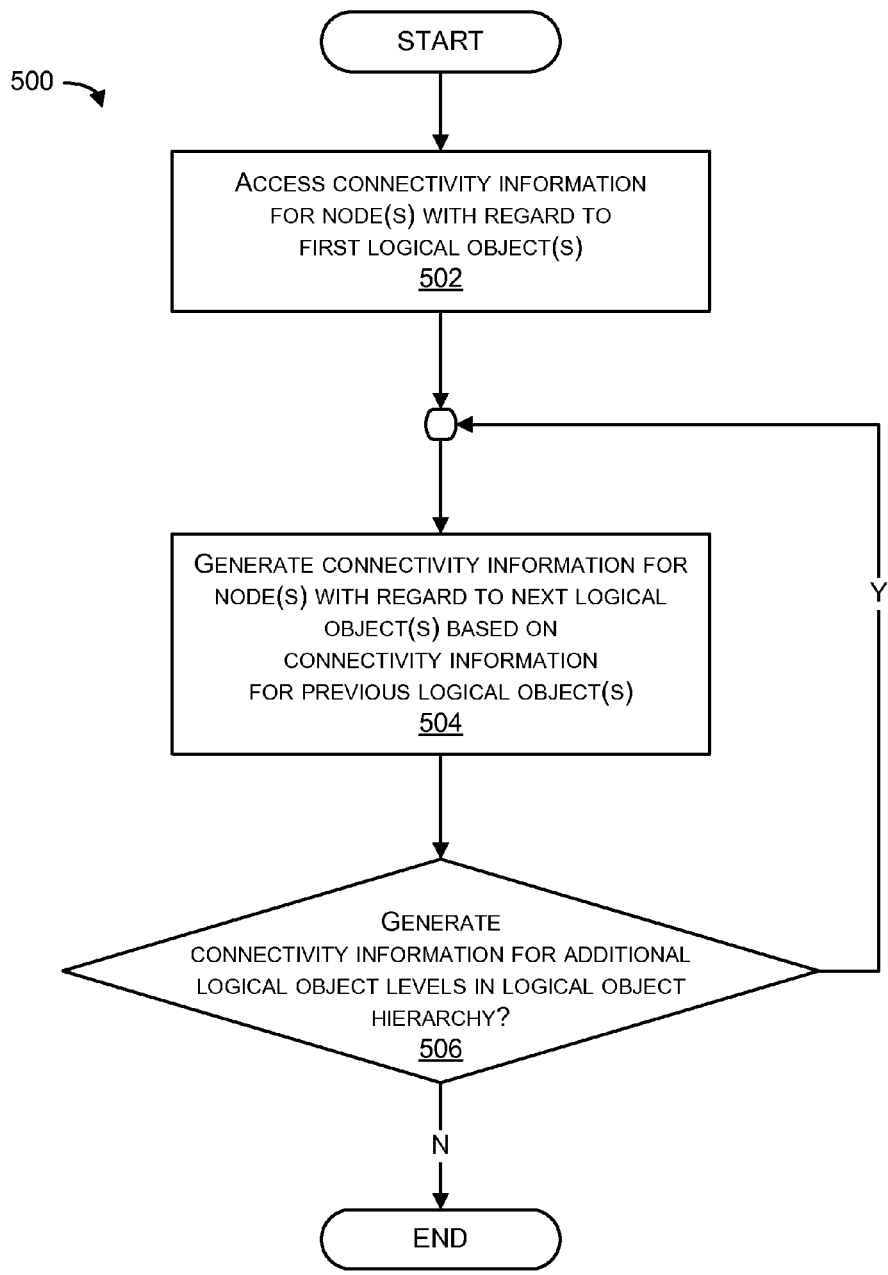
FIG. 5 is a flowchart of a method illustrating generation of node connectivity information, according to one embodiment.

FIG. 5 illustrates a method 500 for generation of node connectivity information, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIG. 1. In one embodiment, method 500 can be executed by the nodes of FIG. 1.

In element 502, the manager software accesses connectivity information for the nodes, according to one or more embodiments. This node connectivity information indicates accessibility of each node to a first type of logical objects. For example, in this element, the connectivity information can indicate accessibility of a node to subdisks (e.g., logical objects 302(1)). In one embodiment, the manager software can first generate node connectivity information from storage connectivity information prior to performing element 502.

In element 504, the manager software generates connectivity information for the nodes based on previously accessed connectivity information, such as connectivity information accessed in element 502. This node connectivity information indicates accessibility of each node to a next type of logical objects, such as logical objects higher in the hierarchy. For example, in this element, the generated connectivity information can indicate accessibility of a node to plexes (e.g., logical objects 302(2)), as generated using connectivity information for subdisks (e.g., logical objects 302(1)).

In element 506, the manager software determines whether there are additional logical object levels for which connectivity information should be generated. For example, with reference to FIG. 3, the manager software can determine whether connectivity information should be calculated for the next level of logical objects, e.g., logical objects 302(3), such as volume. If the manager software determines that there are additional logical objects levels for which connectivity information should be calculated, the manager software continues with element 504, where the next level of connectivity information is generated based on previously accessed connectivity information (which in this case would be connectivity information for logical objects 302(2)). Otherwise the method ends.

It is noted that the manager software can make the determination of element 506 based on a variety of factors. In some cases, the manager software can calculate connectivity information for all of the nodes and for all of the logical objects. In other cases, the connectivity information can calculate connectivity information for all of the nodes, but only for the first one or two logical objects levels (i.e., of the logical object hierarchy, an example of which is shown in FIG. 2). In this embodiment, the manager software can calculate connectivity information for one or more of the remaining logical object level(s) as needed (e.g., when performing on demand and/or "lazy computation"), such as upon occurrence of an I/O error (e.g., as described with reference to FIG. 10). In yet another embodiment, connectivity information can be computed top-down rather than bottom up. For example, when computing connectivity of a particular logical object, connectivity of objects associated with it (i.e., on the same or different level(s)) are computed first.

Figure 6A:
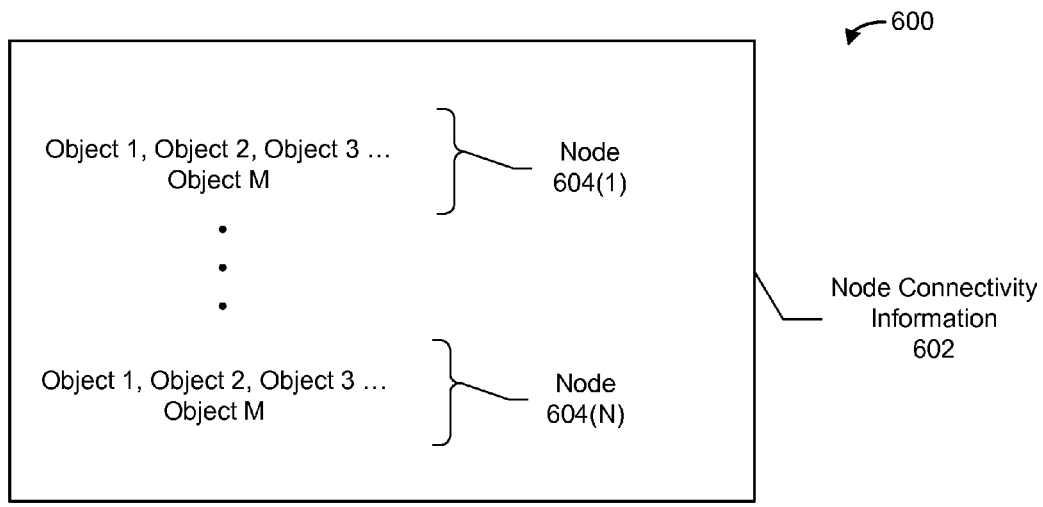
FIGS. 6A-6C are block diagrams illustrating examples of various connectivity information elements, according some embodiments.
Figure 6B:
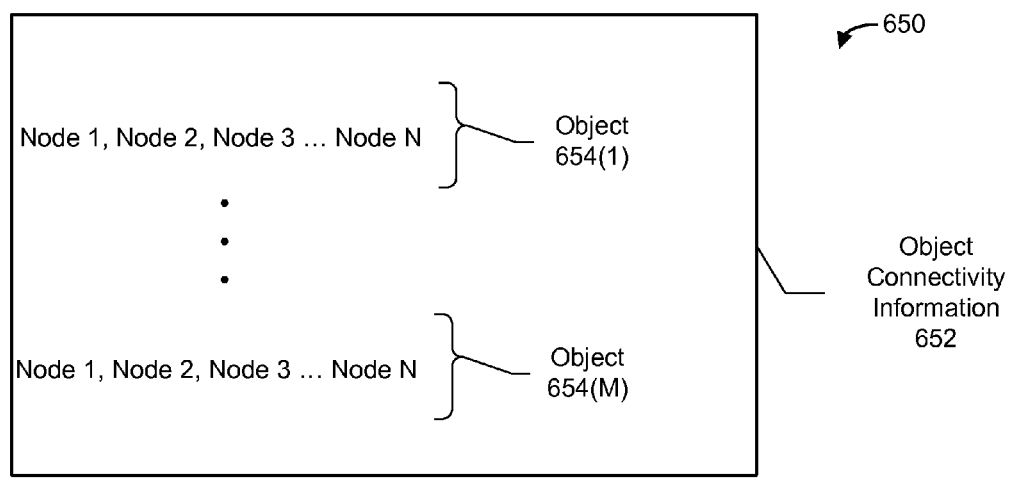
Figure 6C:
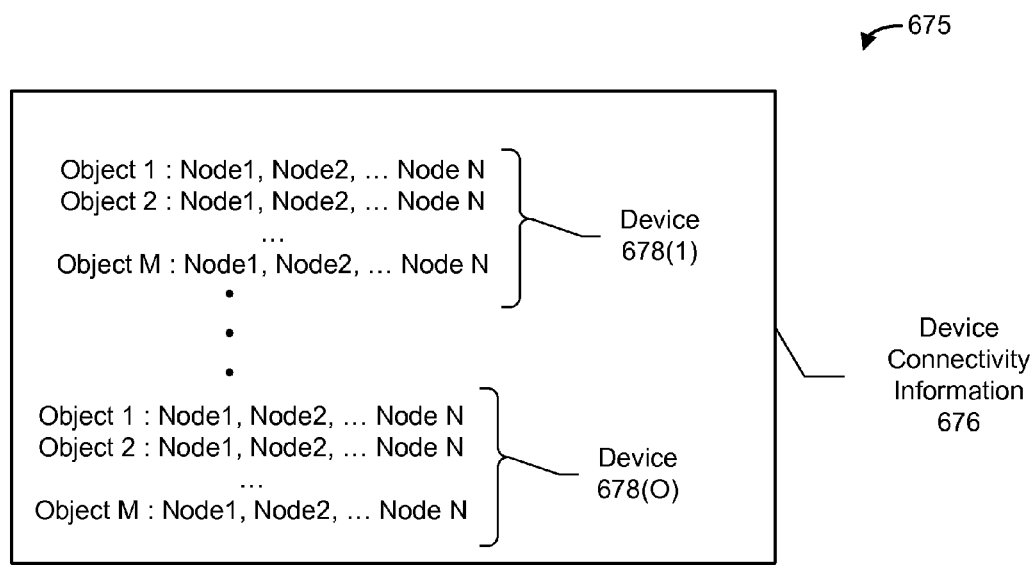

FIGS. 6A-6C are block diagrams illustrating examples of various connectivity information elements, according some embodiments. In some embodiments, connectivity information can include connectivity maps that indicate one element's accessibility to other elements. The connectivity maps can be implemented in various ways, including using binary code, such as a 0 for no or limited connectivity, and 1 for full (or almost full) connectivity. When implemented as connectivity maps, various operations can be easily performed, such as generation of connectivity information for higher level logical objects using lower level logical objects, or determining of connectivity information for write data access, among others. The connectivity information can be stored by the manager software, by one or more of the nodes, and/or using separate storage, as desired.

FIG. 6A shows a block diagram 600 of node connectivity information 602, which can implement node connectivity information of FIGS. 3, 4A, and 4B. In some embodiments, node connectivity information can be generated and/or stored by one or more nodes of the distributed storage system. In one embodiment, each such node can generate and/or store node connectivity information for itself. In another embodiment, the connectivity information generated by each node can be communicated between node(s) of the distributed storage network (e.g., via messages, indications, and/or notifications, etc.). In some embodiments, node connectivity information 602 includes connectivity information 604(1)-604(N) for one or more nodes. Each such node connectivity information 604(1)-604(N) indicates that node's accessibility to logical objects (e.g., logical objects 1-M), such as objects and nodes of FIG. 2.

FIG. 6B shows a block diagram 650 of object connectivity information 652, which can implement object connectivity information of FIGS. 3, 4A, and 4B. In some embodiments, object connectivity information can be generated and/or stored by one or more nodes of the distributed storage system. In one embodiment, each such node can generate and/or store object connectivity information for all, or substantially all, of the accessible logical objects. In another embodiment, the connectivity information can be communicated between node(s) of the distributed storage network (e.g., via messages, indications, and/or notifications, etc.). In some embodiments, object connectivity information 652 includes connectivity information 654(1)-654(M) for one or more objects. Each such object connectivity information 654(1)-654(M) indicates that object's accessibility to nodes (e.g., nodes 1-N), such as objects and nodes of FIG. 2. Furthermore, object connectivity information 652 can include connectivity information for one or more logical object levels (e.g., as illustrated in FIGS. 2 and 3).

FIG. 6C shows a block diagram 675 of device connectivity information 676, which can implement device connectivity information of FIG. 4B. In some embodiments, device connectivity information can be generated and/or stored by one or more nodes of the distributed storage system. In one embodiment, each such node can generate and/or store object connectivity information for all, or substantially all, of the devices, such as devices 210, 212(1)-212(3), and/or 214(1)-214(2) of FIG. 2. In another embodiment, the connectivity information can be communicated between node(s) of the distributed storage network (e.g., via messages, indications, and/or notifications, etc.). In some embodiments, device connectivity information 676 includes connectivity information 678(1)-678(O) for objects 1-M. Each such device connectivity information 678(1)-678(O) indicates that device's accessibility to nodes (e.g., nodes 1-N) and/or to objects (e.g., objects 1-M). In some embodiments, objects associated with a given device inherit the connectivity of device, unless that device has partial failure and/or implements segment reservation/provisioning (e.g., that would reserve some objects for another use). In one embodiment, higher level objects associated with more than one device can derive connectivity from connectivity of those devices.

Figure 7:
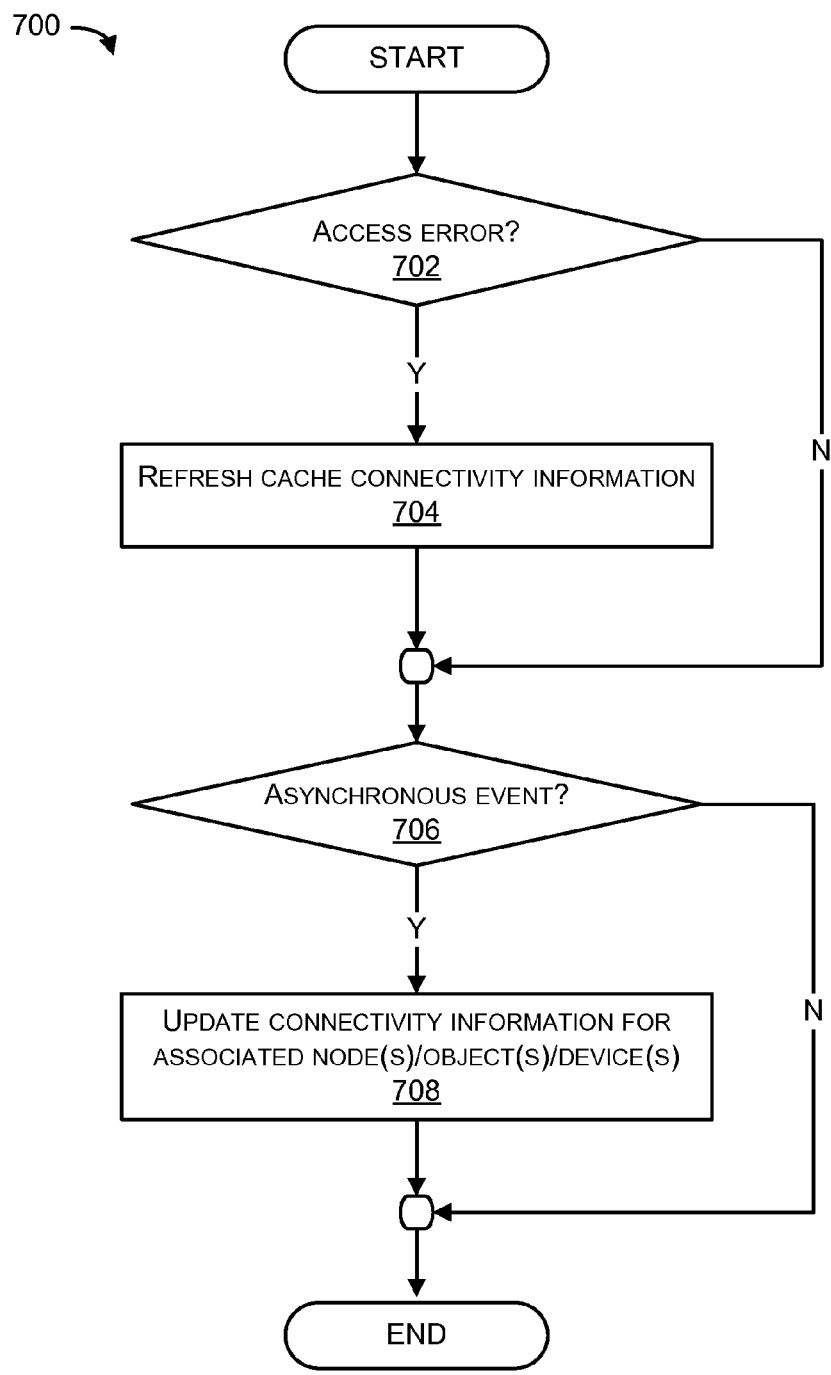
FIG. 7 is a flowchart of a method for updating and/or refreshing connectivity information, according to one embodiment.

FIG. 7 illustrates a method 700 for updating and/or refreshing connectivity information, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 700 is described with reference to variations of the elements described in connection with FIG. 1. In one embodiment, method 700 can be executed by the nodes of FIG. 1.

In element 702, the manager software determines whether there is an access error. For example, manager software 116 can determine that there's an error associated with a read (or a write) data access by node 104(2) to the logical objects stored by storage devices 106(1)-106M and/or 114(1)-114 (P). The manager software can receive an indication/notification of such an access error from one of the nodes and/or administrator software.

In element 704, the manager software refreshes cache connectivity information. In one embodiment, at least some of the connectivity information, such as described with reference to FIGS. 3 and 4A-4B, can be generated and/or stored using a cache. Such cache can be implemented by one or more of the nodes. In some embodiments, such as described with reference to FIG. 7, at least a portion of this connectivity information is refreshed, such as by performing the generation of connectivity information according to the method of FIG. 5 and/or diagrams of FIGS. 4A and 4B. It is noted that in other embodiments, cached connectivity information is not refreshed, even upon occurrence of an access error. In some embodiments, connectivity information can be generated on demand (e.g., due to access error, user query, system diagnostics, and/or administrator software), even if no such cached connectivity information exists.

In element 706, the manager software determines whether an asynchronous event occurred. Such an asynchronous event can include various system events, such as a new hub (e.g., hub 108) coming on-line or off-line, an enclosure and/or disks coming on-line (and being accessible) or an enclosure and/or disks becoming off-line (and being inaccessible), among others. Such events can be communicated between the nodes using a notification system, such as between nodes 104(1)-104(N) and/or 112(1)-112(O). It is noted that an asynchronous event is different from an access error (such as described with reference to FIG. 10). An asynchronous event typically indicates that a certain event occurred related to the distributed storage system.

In element 708, the manager software updates connectivity information for any associated nodes/objects/devices. Thus, element 708 can include determining associated nodes/objects/devices, such as by determining which of the nodes/objects/devices are affected by this asynchronous event. For example, if the asynchronous event indicates that a new disk is being added to a storage device, then connectivity information for any nodes/objects/devices associated with that new disk are updated, such as by performing the generation of connectivity information according to the method of FIG. 5 and/or diagrams of FIGS. 4A and 4B. In one implementation, the manager software can update device connectivity information 460 in response to this asynchronous event.

Figure 8:
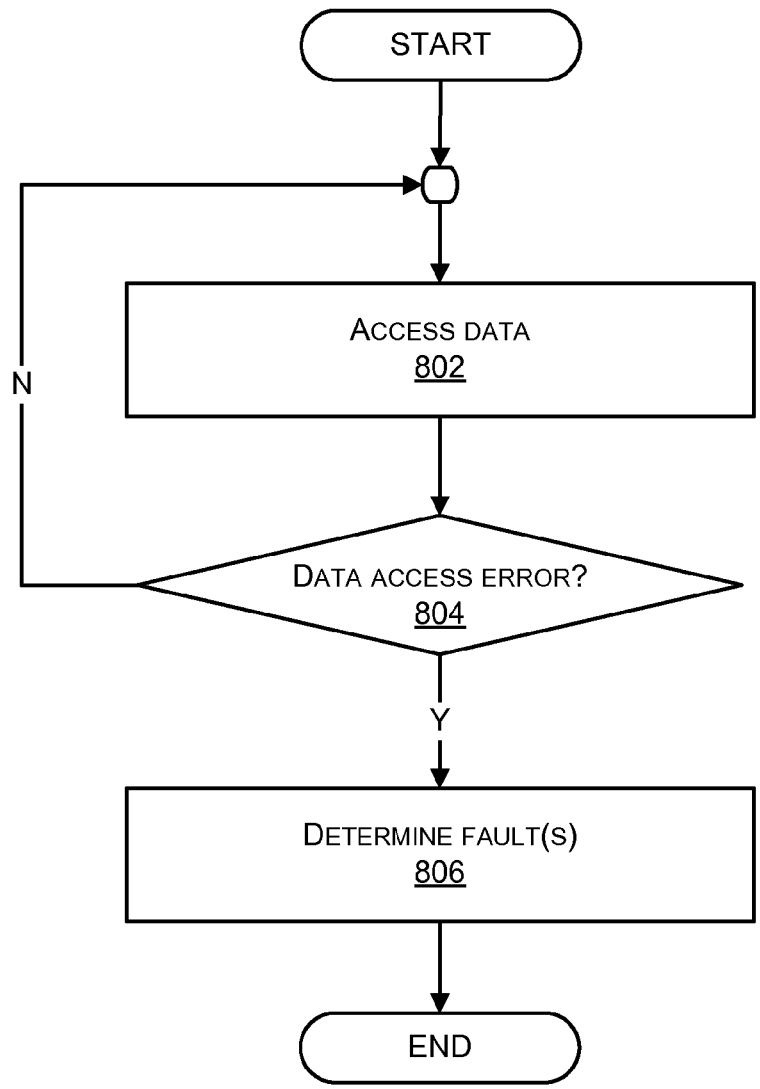
FIG. 8 is a flowchart illustrating a method for determination of a logical fault of a distributed storage system, according to one embodiment.

FIG. 8 illustrates a method 800 for determination of fault(s), according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 800 is described with reference to variations of the elements described in connection with FIG. 1. In one embodiment, method 800 can be executed by the nodes of FIG. 1.

In element 802, one of the nodes accesses data. For example, node 104(1) can perform a read access of data, such as by indicating a location using one or more logical objects. Such a logical object can be a subdisk, which can be physically implemented using storage device 106(1). This read access can be communicated (using a network) to storage 106(1) using hub 108(1). In another example, node 104(2) can perform a write access of data, such as by indicating a location using one or more logical objects. This write access can be communicated (using a network) to storage 106(1) using hub 108(1). In one embodiment, manager software 116 can also mirror this write access to another site, such as to site B 102(2).

In element 804, it is determined whether there is a data access error (i.e., associated with the data access operation of element 202). For example, manager software 116 can make this determination, such as based on communication from nodes of either site. The manager software can receive an indication/notification of such an access error from one of the nodes and/or administrator software.

Nodes (e.g., an application executing on that node) can communicate with manager software 116 with indications of data access success or failure. For example, node 104(2) performing the data write access to a subdisk of site A can receive an indication of a failure of this data write. This indication can be received from software that performs logical object partitioning (such as partitioning of storage devices 106(1)-106(M)/114(1)-114(P)). In one implementation, manager software 116 can also perform this logical object partitioning of storage devices; in this case, manager software 116 can make the data access determination without receiving any such data access indications from the node(s) that originated the data access. If the manager software determines that there is a data access error, then element 806 is implemented next. Otherwise, the manager software implements element 802 next.

In element 806, one or more faults are determined. For example, manager software 116 can make this determination based on the connectivity information, including one or more of the connectivity information for node(s), logical object(s), and/or device(s). In some embodiments, the connectivity information for node(s), logical object(s), and/or device(s) can be generated as described with reference to FIGS. 2-7. In some embodiments, the connectivity information for node(s), logical object(s), and/or device(s) can be generated as described with reference to FIGS. 9-11. In other embodiments, the connectivity information for node(s), logical object(s), and/or device(s) can be generated in other ways, such as by querying each node, storage device, and/or administration software for such connectivity information. The manager software can thus access the connectivity information and determine the logical fault(s), such as described below with reference to FIGS. 9-12.

Figure 9:
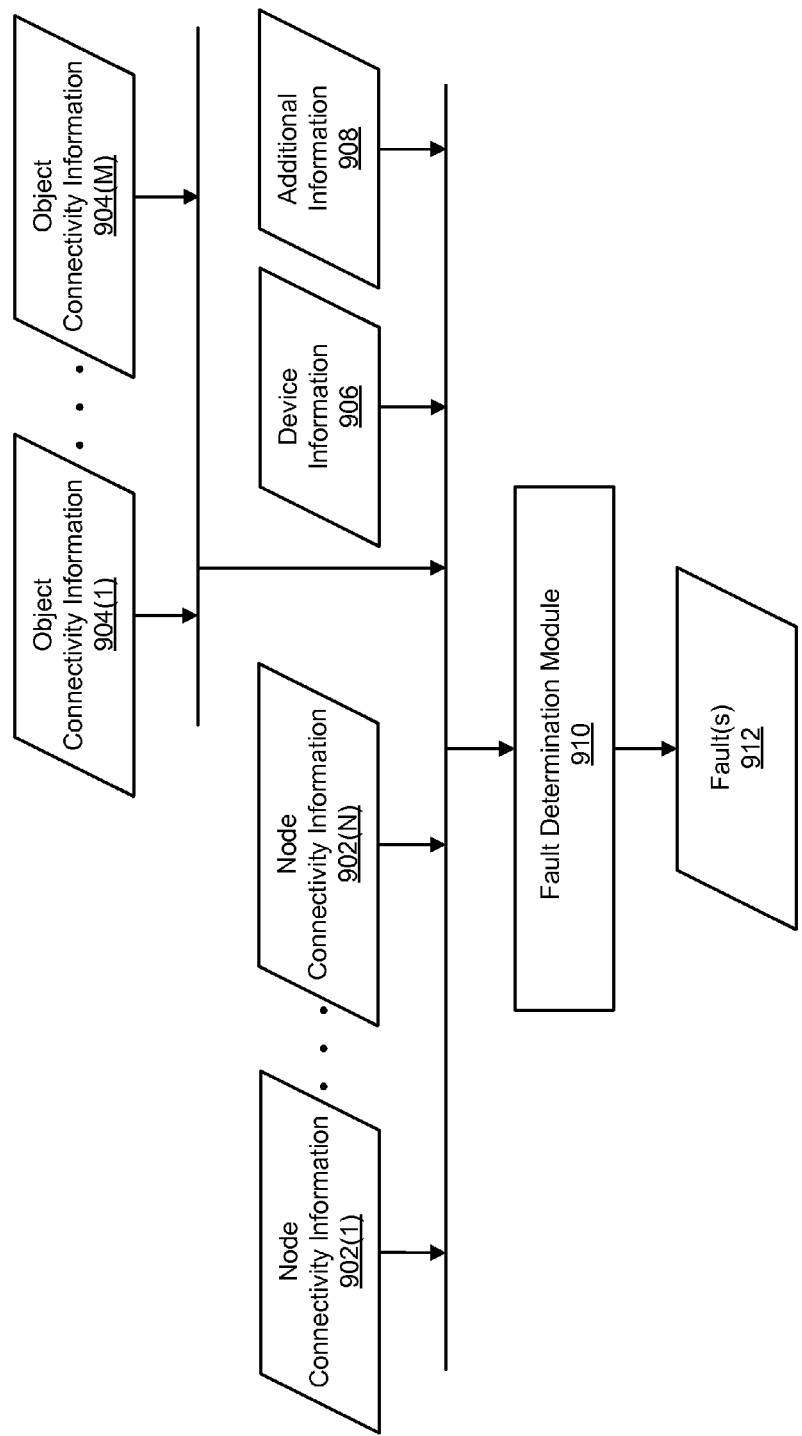
FIG. 9 is a block diagram illustrating determination of fault(s) based on connectivity information, according to one embodiment.

FIG. 9 is a block diagram 900 illustrating determination of fault(s) based on connectivity information, according to some embodiments. FIG. 9 illustrates a fault determination module 910 that receives one or more of node connectivity information 902(1)-902(N), object connectivity information 904(1)-904(M), device information 906, and additional information 908. Based on this received information, fault determination module 910 determines one or more faults. These fault(s) can be determined to be located in one or more objects, nodes, and/or devices. Furthermore, fault determination module 910 can either communicate with, or implement portions of, connectivity information generator(s), such as in order to dynamically generate additional connectivity information. Such implementation(s) are described below with reference to FIG. 10.

For example, fault determination module 910 can efficiently compute accessibility of the logical objects based upon the object hierarchy as well as connectivity of underlying storage (such as indicated by device information). As described above, each node can compute its own connectivity information. In some embodiments, each node can also generate connectivity information of nodes. Although each node can generate connectivity information, this information can vary from node to node, depending on the location and/or type of the access error. From this information, fault determination module 910 can classify logical objects as healthy, degraded, or failed as accessible by one or more node(s) and/or site(s).

For example, fault determination module 910 (e.g., that is implemented by the manager software) determines whether failure is limited to one node or all nodes in a site, or all nodes cluster wide. Similarly fault determination module 910 determines whether the failure is limited to one, some, or all plexes of a single site, or all plexes of the volume. Fault determination module 910 can also determine whether the error in access is between local and remote sites. Once fault determination module 910 computes global connectivity for volume logical objects (e.g., object connectivity information for one or more levels of logical objects, such as for all nodes), fault determination module 910 can then generate connectivity information for each site (e.g., site A and site B), including higher level logical objects (e.g., plexes) that are implemented by each site. For example, connectivity information can be generated that indicates the connectivity information of each storage device for each of the sites.

For example, fault determination module 910 can first determine if failure is local (some node has connectivity) or global (no node has connectivity). For local connectivity, fault determination module 910 can determine which nodes lack connectivity, as well as which site these nodes belong to. For each site with node(s) having connectivity issue(s), fault determination module 910 can compare connectivity information between the nodes to determine if some or all nodes in that site have connectivity issue. Fault determination module 910 is also configured to generate (or to indicate to the connectivity information generator) that object connectivity information, such as to determine connectivity of higher-level logical objects, such as plexes. Furthermore, this connectivity information can be used to map the plex connectivity information to device information (e.g., for sites), such as to determine if some or all plexes in each site have failed.

In a more complicated example, a storage split (e.g., a split-brain condition) can be determined. Fault determination module 910 can compare the accessible objects for each node, based on the node connectivity information. This connectivity information can be compared as generated and/or stored by each node, such as for each of nodes 104(1)-104(N). Fault determination module 910 can access and/or generate additional connectivity information (such as device connectivity information) when performing this calculation. If fault determination module 910 determines that different nodes lost connectivity to different sites (but that at least one site is accessible to all nodes), then a partial storage split condition is detected. If fault determination module 910 determines that different nodes lost connectivity to different sites (and that there is not a single site that is accessible to all nodes), then a full storage split condition is detected.

Fault determination module 910 can also determine other types of faults based on the connectivity information. For example, when the distributed storage system implements a striping policy (e.g., where there is no redundancy), then if a logical object of a plex used for striping is failed, then fault determination module 910 can determine that stripe as being failed. On the other hand, if a logical object implements RAID-5, then fault determination module 910 determines that this object it will be healthy if all associated sub-objects are healthy, degraded if at most one associated object is not healthy, and faulted if more than one associated objects are not healthy. For example, when the distributed storage system implements a mirroring policy (such as where plexes of a second site represent copies of plexes of a first site), then a volume at the second site is considered healthy only if all plexes of that second site have full connectivity, and degraded if at least one plex in the site is healthy and failed/faulted otherwise. In these examples, fault determination module 910 can use additional information 908 that can indicate whether fault(s) are to be generated for a certain data access type, such as a read access and/or a write access.

Figure 10A:
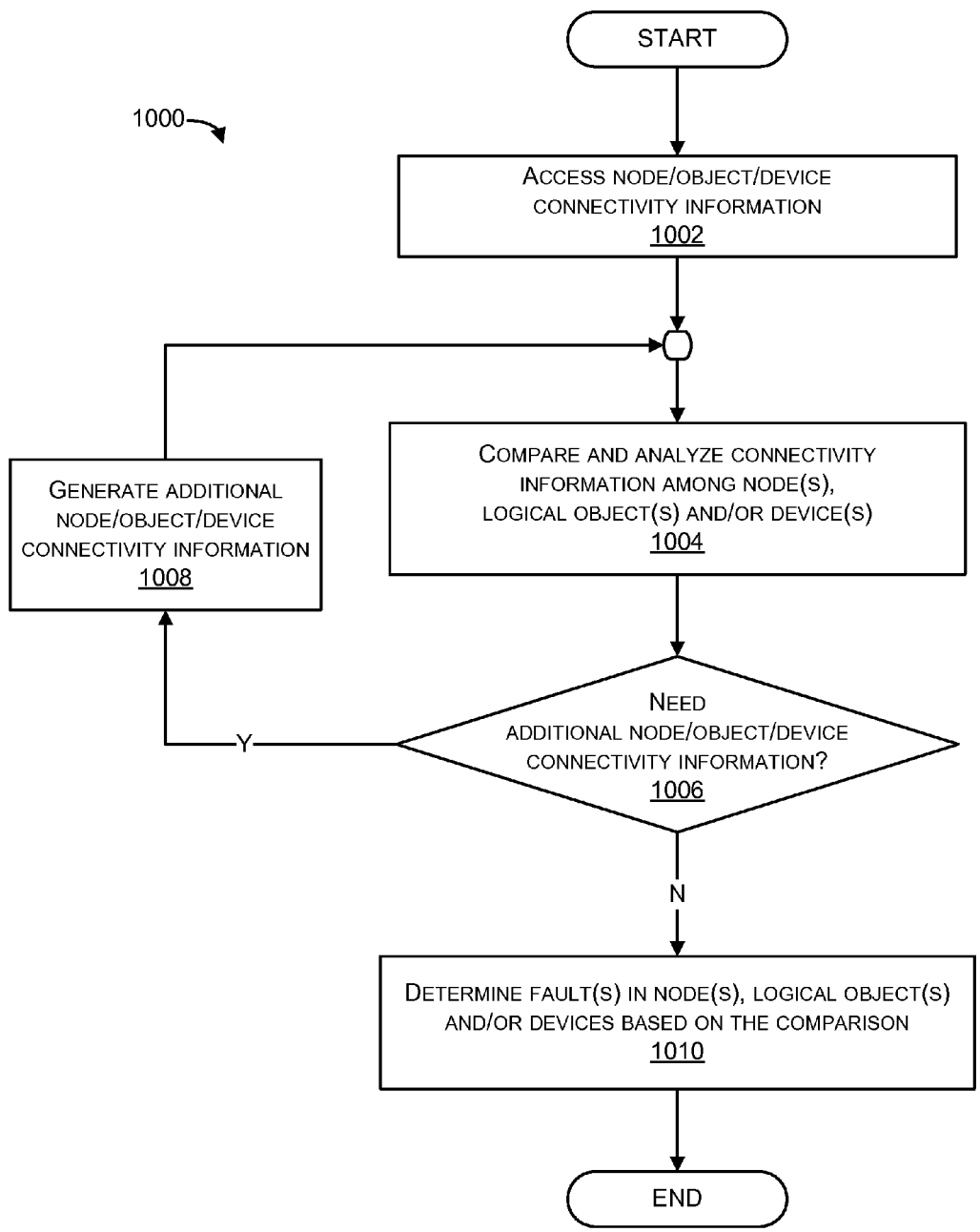
FIGS. 10A and 10B are flowcharts illustrating methods for determination of fault(s) based on connectivity information, according to some embodiments.

FIG. 10A illustrates a method 1000 for fault determination based on analysis of connectivity information, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 1000 is described with reference to variations of the elements described in connection with FIG. 1. In one embodiment, method 1000 can be executed by one or more nodes of FIG. 1, such as by the manager software. The manager software can perform this access as part of element 806.

In element 1002, the manager software accesses connectivity information for one or more nodes, objects, and/or devices. The manager software can also access additional information. In some embodiments, the additional information can include one or more of backup policy as implemented by the distributed storage system. The additional information can also include node connectivity information that is generated for data reads and/or data writes. The additional information can also include configuration parameters, specifications, and/or performance metrics. The configuration parameters can indicate configuration of physical devices (e.g., network(s), hubs, physical disks, and/or enclosures), such as the size, location, logical address, physical address, number of users, etc. The specifications can include expected metrics for the physical devices, such as bandwidth, speed, latency, storage size, etc. The performance metrics can include measured performance metrics for the physical devices.

In element 1004, the manager software compares and analyzes the connectivity information for one or more nodes, objects, and/or devices. For example, the manager software can determine, based on the connectivity information that is currently generated/stored/accessible, the node, object, or device that has limited or no connectivity. In one embodiment, the manager software can analyze connectivity maps for the nodes, objects, and/or devices. By using connectivity maps, such comparisons can be performed faster. For example, analysis of connectivity maps for nodes can indicate that the connectivity of a second node to logical objects is limited, whereas a first node has full connectivity to objects.

Figure 10B:
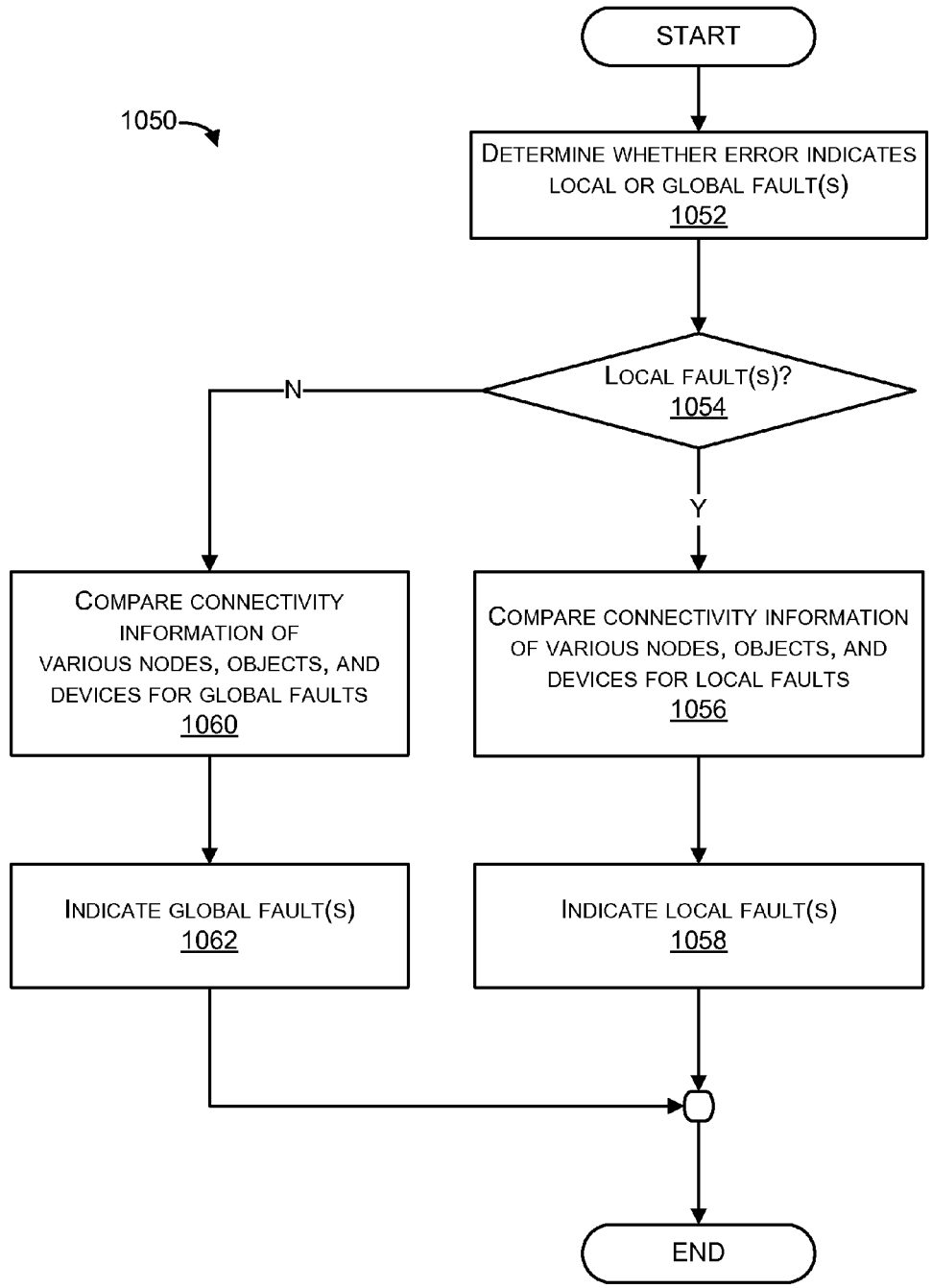

FIG. 10B illustrates a method 1050 for comparison and analysis of the connectivity information, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 1050 is described with reference to variations of the elements described in connection with FIG. 1. In one embodiment, method 1050 can be executed by one or more nodes of FIG. 1, such as by the manager software. The manager software can perform this access as part of element 1004.

In one embodiment, in element 1052, the manager software can analyze the node connectivity information to determine whether the fault(s) are local or global. A local fault indicates that only some of the nodes lost connectivity to the logical objects, whereas a global fault indicates that (substantially) all of the nodes have lost connectivity to the logical objects. The manager software makes this determination by examining the node connectivity information (which may have been updated after this access error and before element 1052 is performed, depending on the implementation). The manager software can determine that only some of the nodes have limited or no access to the logical objects. The manager software can determine that fault(s) are local if some nodes have connectivity to the logical objects.

If the faults are local, then element 1056 is performed, where the manager software can determine the sites that these nodes belong to. For example, if node 104(1) has limited connectivity but the other nodes 104(2)-104(N) and 112(1)-112(O) have full connectivity, then the manager software can determine that site 102(1) includes that node 104(1). Next, the manager software can compare the connectivity information for the node with the connectivity issue to the other nodes of that site. The manager software can perform this comparison for nodes of each site. Furthermore, the manager software may indicate that node connectivity maps for hierarchically higher level logical objects, e.g., plexes, should be generated.

On the other hand, if the faults are global, then element 1058 is performed. The faults are global if (substantially) all of the nodes have no connectivity. In element 1058, the manager software can determine that a connecting link, such as a network or one or more hubs between the sites, or that all of the storage devices have errors/faults. In element 1062, the manager software can indicate that there are local fault(s). However, in element 1062, the manager software may not have been able to fully analyze the access error, such as if there are additional connectivity maps that should be generated.

With reference back to FIG. 10A, in element 1006, the manager software determines whether additional connectivity information for one or more nodes, objects, and/or devices is needed. This determination can be based, for example, on whether the manager software can determine the fault(s) using the connectivity information that is already generated and/or cached. For example, the manager software can determine that the fault cannot be found based on the connectivity maps that are already generated. As a result, the manager software can indicate that additional connectivity information for one or more nodes, objects, and/or devices should be generated. If the manager software indicates that additional connectivity information should be generated, element 1008 is performed next. Otherwise, element 1010 is performed next.

In element 1008, the manager software and/or nodes can generate additional connectivity information for one or more nodes, objects, and/or devices. Such generation can be performed according to FIGS. 4A, 4B, and 5. In another embodiment, the manager software can determine that for some reason, the cached connectivity information is old, e.g., stale, and at least a part of that connectivity information should be re-generated, such as according to element 704 of FIG. 7.

In element 1010, the manager software can determine the fault(s) based on the comparison and/or analysis of element 1004. In one embodiment, the manager software can classify the type of fault based on a type of data access action. For example, whereas a read access can be performed using just one of two plexes (e.g., that are mirrors of each other), a write access should be performed using both of these two plexes. In this example, the manager software can determine the fault(s) using the more restrictive semantic that is based on the data write.

These fault(s) can be then reported, e.g., communicated, to a fault correction module, administrative module, and/or users. A fault correction module (or the administrative module and/or users) can then perform one or more corrective actions, such as to correct the fault(s). The corrective actions may include disconnecting a portion of the logical objects/devices, generating and/or using new logical objects and/or devices, among others. For example, the corrective actions can include, in case where one plex is used by a distributed storage system implementing a mirroring policy, the administrative module allowing data access reads from the one operational plex of two plexes. However, the administrative module may not allow data access writes to just one plex, and instead may use another plex for performing mirroring operations.

Figure 11A:
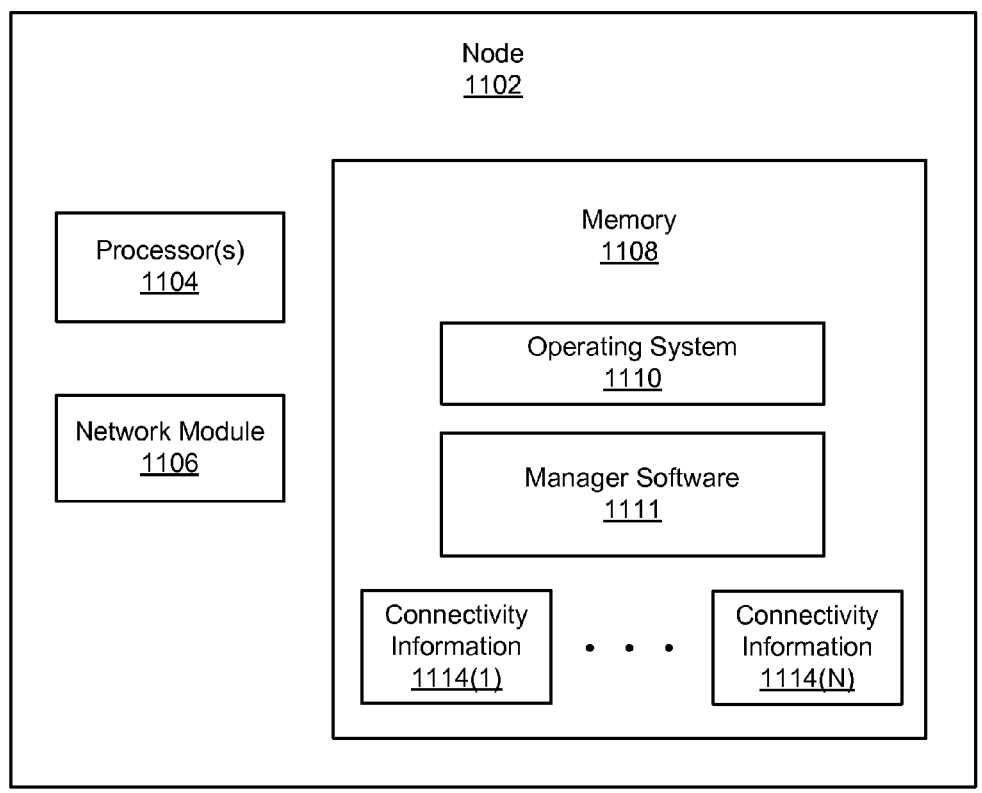
FIGS. 11A and 11B are block diagrams illustrating examples of a node and modules of a distributed storage system, according to one embodiment.

FIGS. 12A and 12B are block diagrams illustrating nodes that can be used by the distributed storage system, according to some embodiments. FIG. 11A is a block diagram 1100 of a node 1102, such as node 104(1)-102(N), 111(1)-111(O), 216(1), and/or 216(2). Node 1102 includes a processor 1104, network module 1106, and a memory 1108. Memory 1108 includes an operating system 1110, manager software 1111, and connectivity information 1114(1)-1114(N). It is noted that one or more of element(s) of manager software 1111 may be implemented as a software and/or hardware module. It is also noted that in some embodiments one or more of elements of node 1102 may not be used. Processor(s) 1104 can execute one or more of elements 1110 and 1111. Manager software 1111 can be an implementation of manager software 116, and can implement at least portions of methods 500, 700, 800, 1000, and/or 1050. Furthermore, modules can implement code for determining connectivity and/or faults related to objects stored by such storage systems (such as described above with reference to FIGS. 3, 4A, 4B, and/or 9).

Figure 11B:
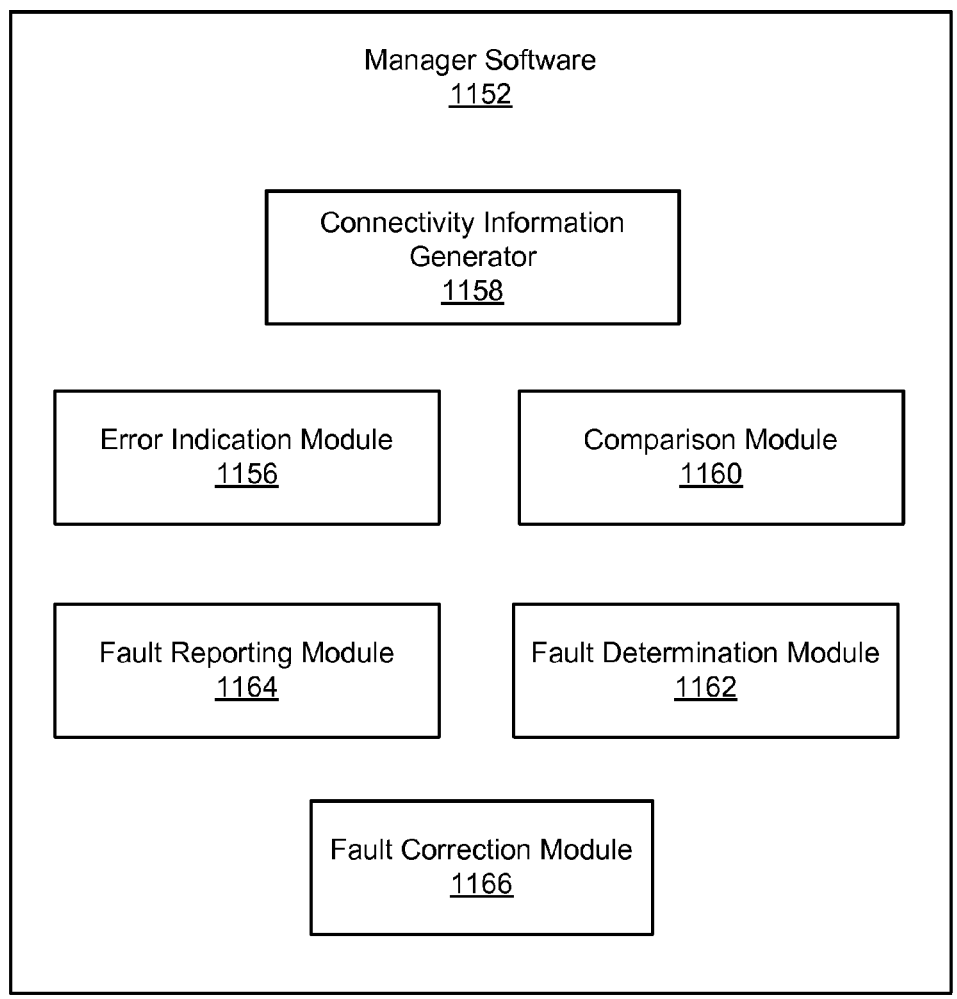

FIG. 11B is a block diagram 1150 of manager software 1152, such as of manager software 116 and/or 1111. Manager software 1152 includes an error indication module 1156, a connectivity information generator 1158, a comparison module 1160, a fault determination module 1162, and a fault correction module 1166. It is noted that one or more of element(s) of manager software 1152 may be implemented as a software and/or hardware module. It is also noted that in some embodiments one or more of elements of manager software 1152 may not be used. In some embodiments, one or more elements of manager software 1152 can be combined, as desired. Error indication module 1156 is configured to indicate data access error, such as described by element 804 of method 800. Connectivity information generator 1158 is configured to generate connectivity information for object(s), node(s), and/or device(s), and/or can implement connectivity information generator of FIGS. 4A-4B. Comparison module 1160 is configured to compare and analyze connectivity information for connectivity information for object(s), node(s), and/or device(s), such as described by element 1104 of method 1000. Fault determination module 1162 is configured to determine fault(s) in object(s), node(s), and/or device(s), such as described by element 806, and/or 1010. Fault reporting module 1164 is configured to report fault(s) to administrative module(s) and/or users. Fault correction module 1166 is configured to take one or more corrective actions, such as to correct the fault(s).

Figure 12:
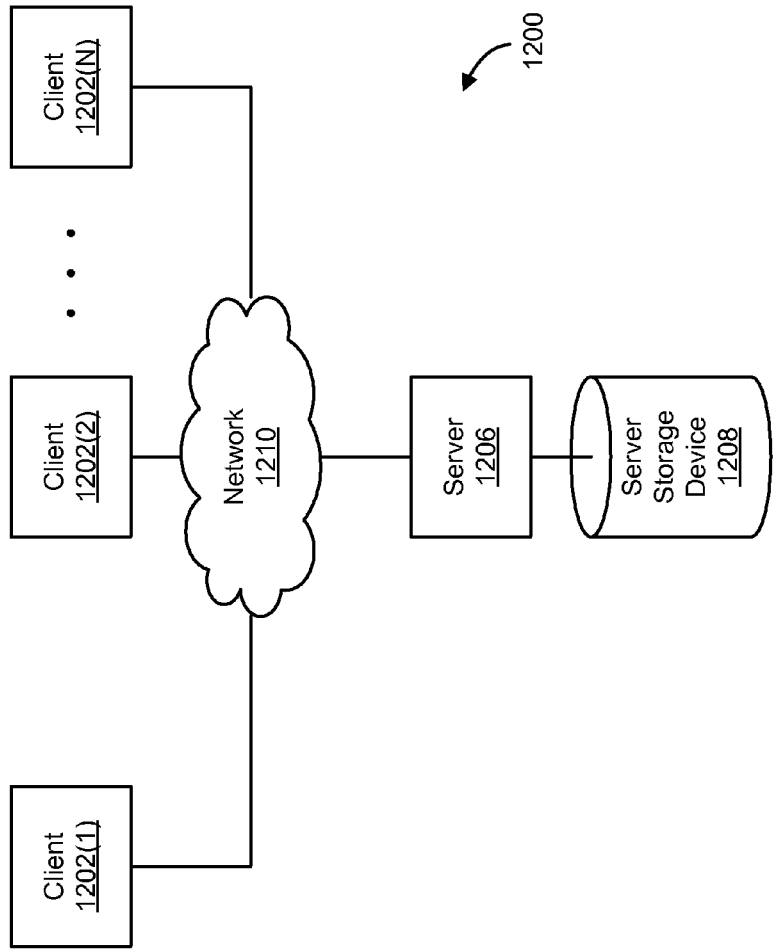
FIG. 12 is a block diagram illustrating a network architecture in which embodiments of the present application can be implemented.

Elements of network architecture can be implemented using different computer systems and networks. An example of one such network environment is described below with reference to FIG. 12. FIG. 12 is a simplified block diagram illustrating a network architecture 1200 in which one or more clients are provided with access to a server via various network connections. As depicted in FIG. 12, clients 1202(1)-(N) are coupled to a network 1212, and so are able to access a server 1206 (which can be used to implement node(s) of FIGS. 1, 2, and/or 12A) via network 1212. Other servers (not shown) can be used instead to implement node(s) of FIGS. 1, 2, and/or 11A). A client can be implemented using, for example, a desktop computer, a laptop computer, a workstation, a server, a cell phone, a smart phone, a network-enabled personal digital assistant (PDA), or the like. An example of network 1212, which can be used by clients 1202(1)-(N) to access server 1206, is the Internet. Alternatively, access to server 1206 can be provided by a local area network (LAN) utilizing Ethernet, IEEE 802.11x, or some other communications protocol. As will be appreciated, server 1206 can be accessed by clients coupled directly thereto (not shown).

As also depicted on FIG. 12, server 1206 is coupled to a server storage device 1208, which includes a data volume such as storage 128/112, among others. Server storage device 1208 can be implemented as a single storage device or a collection of storage devices. Server storage device 1208 can also be implemented as a storage area network, which couples remote storage devices to a server (e.g., server 1206), such that the remote storage devices appear as locally-attached storage devices to the server's OS, for example.

In light of the present disclosure, those of skill in the art will appreciate that server storage device 1208 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1200 can include other components such as routers, firewalls and the like that are not germane to the discussion of the present network and will not be discussed further herein. Those of skill in the art will also appreciate that other configurations are possible. For example, clients 1202(1)-(N) can be directly coupled to server storage device 1208 without the user of a server or Internet; server 1206 can be used to implement both the clients and the server; network architecture 1200 can be implemented without the use of clients 1202(1)-(N); and so on.

As an example implementation of network architecture 1200, server 1206, services requests to data generated by clients 1202(1)-(N) to data stored in server storage device 1208. Any of the functionality of the nodes, agents, and/or manager software can be implemented using one of the node(s) of FIGS. 1, 2, and/or 11A.

Figure 13:
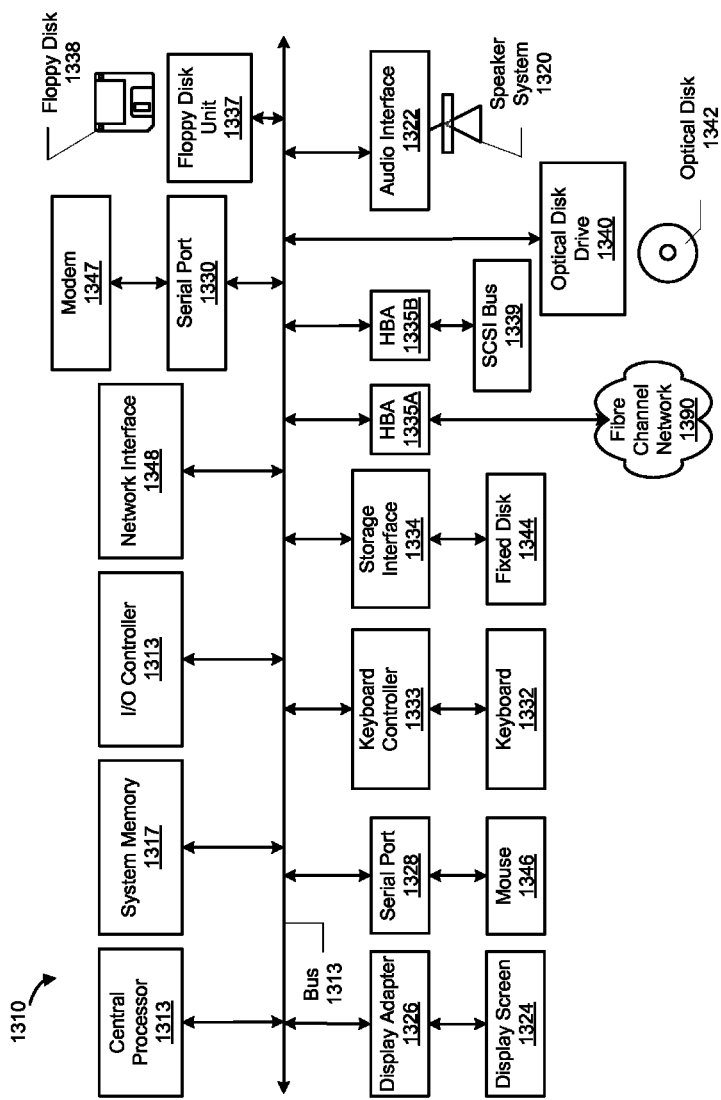
FIG. 13 is a block diagram that illustrates an example of a computer system suitable for implementing embodiments of the present application.

FIG. 13 depicts a block diagram of a computer system 1310 suitable for implementing the present disclosure. Computer system 1310 may be illustrative of various computer systems in the networked system of FIG. 1, such as node(s) and/or coordinator node(s), among others. Computer system 1310 includes a bus 1312 which interconnects major subsystems of computer system 1310, such as a central processor 1313, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1313 and system memory 1317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1310 are generally stored on and accessed via a computer readable medium, such as a hard disk drive (e.g., fixed disk 1344), an optical drive (e.g., optical drive 1340), a floppy disk unit 1337, or other storage medium. Additionally, applications can be in the form of electronic signals modulated in accordance with the application and data communication technology when accessed via network modem 1347 or interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the present disclosure. The devices and subsystems can be interconnected in different ways from that shown in FIG. 13. The operation of a computer system such as that shown in FIG. 13 is readily known in the art and is not discussed in detail in this application. Code for determining connectivity and/or faults related to objects stored by such storage systems (such as described above with reference to the methods of FIGS. 5, 7, 8, 10, and/or 11, as well as functionality described with reference to FIGS. 3, 4A, 4B, and/or 9), etc., to implement the present disclosure can be stored in computer-readable storage media such as one or more of system memory 1317, fixed disk 1344, optical disk 1342, or floppy disk 1338. Memory 1320 is also used for storing temporary variables or other intermediate information during the execution of instructions by the processor 1310. The operating system provided on computer system 1310 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating first node connectivity information at a first node, wherein
   the first node is configured to access data in a Storage Area Network (SAN),
   the data is organized using a plurality of logical objects,
   the plurality of logical objects comprise a plurality of storage objects, a plurality of first logical objects and a plurality of second logical objects,
   the first node connectivity information indicates accessibility of the first node to the plurality of first logical objects, and
   one or more of the plurality of second logical objects comprise at least one first logical object of the plurality of first logical objects;
   generating storage connectivity information at the first node, wherein
   the storage connectivity information indicates accessibility of the first node to one or more of the plurality of storage objects, and
   the generating the storage connectivity information is based on the first node connectivity information;
   generating object connectivity information at the first node, wherein
   the generating the objective connectivity information comprises determining that the at least one first logical object is associated with at least one storage object of the plurality of storage objects based on the node connectivity information and the storage connectivity information, and determining whether the first node can fully or partially access the at least one storage object;

storing the first node connectivity information, the storage connectivity information, and the object connectivity information at the first node; and processing the first node connectivity information, the storage connectivity information, and the object connectivity information in response to an input/output (I/O) error in the SAN.

2. The method of claim 1, further comprising:

generating the first node connectivity information for a second node, wherein the first node connectivity information for the first node indicates accessibility of the second node to the plurality of first logical objects, and the second node is configured to access the data in the SAN; and generating the storage connectivity information for the second node, wherein the storage connectivity information for the second node indicates accessibility of the second node to the one or more of the plurality of the storage objects, and the generating the storage connectivity information for the second node is based on the first node connectivity information for the second node.

3. The method of claim 2, further comprising:

accessing the first node connectivity information for the second node, wherein the first node connectivity information for the second node indicates accessibility of the second node to the plurality of first logical objects; and generating first object connectivity information for a first logical object of the plurality of first logical objects, wherein the generating the first object connectivity information is based on the first node connectivity information for the first node and on the storage connectivity information for the second node, and the first object connectivity information for the first object indicates full or partial accessibility of the first logical object to the at least one storage object.

4. The method of claim 1, further comprising:

determining whether the first node can access each of the plurality of first logical objects, and each of the plurality of storage objects.

5. The method of claim 1, wherein the storage connectivity information for the first node comprises a write storage connectivity information for the first node, and the write storage connectivity information for the first node indicates whether the first node can write data to one or more of the plurality of storage objects.

6. The method of claim 1, wherein the storage connectivity information for the first node comprises a read storage connectivity information for the first node, and the read storage connectivity information for the first node indicates whether the first node can read data from one or more of the plurality of storage objects.

7. The method of claim 1, wherein the one or more nodes are coupled to one or more storage units, the one or more storage units store the data, and the one or more nodes are configured to access the data using the plurality of logical objects and the plurality of storage objects.

8. The method of claim 1, wherein the storage connectivity information for the first node is generated in response to receiving a data access error, and the data access error indicates an error of the first node accessing data stored using one or more of the plurality of first logical objects.

9. The method of claim 1, further comprising:

determining whether an error occurred during a data access of at least one of the plurality of logical objects; and in response to a determination that the error occurred, determining a scope of a logical fault in the SAN, wherein the determining of the scope of the logical fault is based the first node connectivity information, the storage connectivity information, and the object connectivity information, and the scope of the logical fault indicates an extent of one or more faults of the one or more logical objects of the plurality of logical objects.

10. The method of claim 9, wherein the determining of the scope of the logical fault comprises comparing the first node connectivity information of the first node to the storage connectivity information of a second node.

11. The method of claim 1, wherein the plurality of storage objects are part of one or more disk groups, and each disk group of the one or more disk groups comprises a first set of storage objects of the plurality of storage objects comprising one or more volumes, a second set of storage objects of the plurality of storage objects comprising one or more plexes, and a third set of storage objects of the plurality of storage objects comprising one or more subdisks.

12. The method of claim 1, wherein the object connectivity information is generated by filtering the first node connectivity information generated at the first node, and the first node connectivity information is associated with a logical object level for the at least one first logical object.

13. The method of claim 1, wherein the plurality of storage objects comprise a hierarchy of one or more volumes, one or more plexes, and one or more subdisks.

14. The method of claim 1, wherein the storing permits determination of a scope of a logical fault in the SAN if the I/O error occurs during data access of the at least one storage object.

15. The method of claim 14, wherein the processing permits rectification of the I/O error and the logical fault.

16. A system comprising:

one or more processors, and a connectivity information generator, wherein the connectivity information generator is configured to generate first node connectivity information at a first node, wherein the first node is configured to access data in a Storage Area Network (SAN), the data is organized using a plurality of logical objects, the plurality of logical objects comprise a plurality of storage objects, a plurality of first logical objects and a plurality of second logical objects, the first node connectivity information indicates accessibility of the first node to the plurality of first logical objects, and one or more of the plurality of second logical objects comprise at least one first logical object of the plurality of first logical objects;

generate storage connectivity information at the first node, wherein the storage connectivity information indicates accessibility of the first node to one or more of the plurality of storage objects, and the generating the storage connectivity information is based on the first node connectivity information;

generating object connectivity information at the first node, wherein the generating the objective connectivity information comprises determining that the at least one first logical object is associated with at least one storage object of the plurality of storage objects based on the node connectivity information and the storage connectivity information, and determining whether the first node can fully or partially access the at least one storage object;

store the first node connectivity information, the storage connectivity information, and the object connectivity information at the first node; and process the first node connectivity information, the storage connectivity information, and the object connectivity information in response to an input/output (I/O) error in the SAN, wherein the connectivity information generator is configured to be executed using the one or more processors.

17. The system of claim 16, wherein the connectivity information generator is further comprised to:

access the first node connectivity information for a second node, wherein the first node connectivity information for the second node indicates accessibility of the second node to the plurality of first logical objects; and generate first object connectivity information for a first logical object of the plurality of first logical objects, wherein the generating the first object connectivity information is based on the first node connectivity information for the first node and on the storage connectivity information for the second node, and the first object connectivity information for the first object indicates accessibility of the first logical object to at least the first node and to the second node.

18. The system of claim 17, wherein the connectivity information generator is further comprised to:

access the first object connectivity information for a second logical object, wherein the first object connectivity information for the second logical object indicates accessibility of the second logical object to at least the first node and to the second node; and generate first device connectivity information for a first device, wherein the generating the first device connectivity information is based on the first object connectivity information for the first object, the first object connectivity information for the second object, and the first device information, wherein the first device information indicates one or more objects that are stored using the first device, and the first device connectivity information for the first device indicates full or partial accessibility of one or more logical objects of the plurality of logical objects that are stored using the first device to at least the first node and to the second node.

19. The system of claim 16, wherein the storing permits determination of a scope of a logical fault in the SAN if the I/O error occurs during data access of the at least one storage object, and the processing permits rectification of the I/O error and the logical fault.

20. The system of claim 16, wherein the plurality of storage objects comprise a hierarchy of one or more volumes, one or more plexes, and one or more subdisks.

21. A non-transitory computer program product comprising:

a plurality of instructions, comprising a first set of instructions, executable on a computer system, configured to generate first node connectivity information at a first node, wherein the first node is configured to access data in a Storage Area Network (SAN), the data is organized using a plurality of storage tiers comprising a plurality of logical objects, the plurality of logical objects comprise a plurality of storage objects, a plurality of first logical objects and a plurality of second logical objects, the first node connectivity information for the first node indicates accessibility of the first node to the plurality of first logical objects, and one or more of the plurality of second logical objects comprise at least one first logical object of the plurality of first logical objects;

a second set of instructions, executable on the computer system, configured to generate storage connectivity information at the first node, wherein the storage connectivity information indicates accessibility of the first node to one or more of the plurality of storage objects, and generating the storage connectivity information is based on the first node connectivity information;

a third set of instructions, executable on the computer system, configured to generate object connectivity information at the first node, wherein the generating the objective connectivity information comprises determining that the at least one first logical associated with at least one storage object of the plurality of storage objects based on the node connectivity information and the storage connectivity information, and determining whether the first node can fully or partially access the at least one storage object;

a fourth set of instructions, executable on the computer system, configured to store the first node connectivity information, the storage connectivity information, and the object connectivity information at the first node;

a fifth set of instructions, executable on the computer system, configured to process the first node connectivity information, the storage connectivity information, and the object connectivity information in response to an input/output (I/O) error in the SAN; and a computer-readable storage medium, wherein the instructions are encoded in the computer-readable storage medium.

22. The non-transitory computer program product of claim 21, wherein the storing permits determination of a scope of a logical fault in the SAN if the I/O error occurs during data access of the at least one storage object, and the processing permits rectification of the I/O error and the logical fault.

23. The non-transitory computer program product of claim 21, wherein the plurality of storage objects comprise a hierarchy of one or more volumes, one or more plexes, and one or more subdisks.

\* \* \* \* \*